US012677171B2

(12) United States Patent
Hong

(10) Patent No.: US 12,677,171 B2
(45) Date of Patent: Jul. 7, 2026

(54) COMMUNICATION METHOD AND APPARATUS, AND STORAGE MEDIUM

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 435 days.

(21) Appl. No.: 18/028,473

(22) PCT Filed: Sep. 28, 2020

(86) PCT No.: PCT/CN2020/118558
§ 371 (c)(1),
(2) Date: Mar. 24, 2023

(87) PCT Pub. No.: WO2022/061930
PCT Pub. Date: Mar. 31, 2022

(65) Prior Publication Data
US 2023/0362693 A1 Nov. 9, 2023

(51) Int. Cl.
*H04W 24/08* (2009.01)
*H04W 8/18* (2009.01)
(Continued)

(52) U.S. Cl.
CPC ........... *H04W 24/08* (2013.01); *H04W 8/183* (2013.01); *H04W 72/0446* (2013.01); *H04W 24/10* (2013.01); *H04W 88/06* (2013.01)

(58) Field of Classification Search
CPC . H04W 24/08; H04W 8/183; H04W 72/0446; H04W 24/10; H04W 88/06
(Continued)

(56) References Cited

U.S. PATENT DOCUMENTS

2021/0120524 A1* 4/2021 Palle .................. H04W 68/005
2021/0345152 A1* 11/2021 Kimba Dit Adamou ...................
H04W 24/02

FOREIGN PATENT DOCUMENTS

CN 110771196 A 2/2020
CN 111314931 A 6/2020
WO WO 2019173936 A1 9/1999

OTHER PUBLICATIONS

European patent application No. 20954777.7 Search Report dated May 21, 2024, 12 pages.
(Continued)

*Primary Examiner* — Asad M Nawaz
*Assistant Examiner* — Hugh Mark Ashley
(74) *Attorney, Agent, or Firm* — Cozen O'Connor

(57) ABSTRACT

In a communication method, a first base station accessed by a first SIM card of a multi-card terminal sends configured target measurement information to a second base station accessed by a second SIM card of the multi-card terminal and the first SIM card. In another communication method, the second base station stops sending data and signaling to the second SIM card or communicating with the second SIM card within a second time unit other than a first time unit, in response to determining based on the target measurement information that a condition of resolving an MDT collision is satisfied. In still another communication method, the multi-card terminal performs the MDT measurement by the first SIM card after the first SIM card has switched to an idle state in response to determining based on the target measurement information that the MDT measurements needs to be performed.

20 Claims, 14 Drawing Sheets

(51) Int. Cl.
  *H04W 24/10*      (2009.01)
  *H04W 72/0446*    (2023.01)
  *H04W 88/06*      (2009.01)
(58) Field of Classification Search
   USPC .......................................................... 370/252
   See application file for complete search history.

(56) References Cited

OTHER PUBLICATIONS

3 Generation Partnership Project; Technical Specification Group Radio Access Network; Universal Terrestrial Radio Access (UTRA), Evolved Universal Terrestrial Radio Access (E-UTRA)and Next Generation Radio Access; Radio measurement collection for Minimization of Drive Tests (MDT); Overall description, 3GPP TS 37.320 V16.1.0, Jul. 2020, 33 pages.
Indian Patent Application No. 202347026515, Office Action dated Oct. 4, 2023, 9 pages.
PCT/CN2020/118558 English translation of Search Report dated Jun. 25, 2021, 3 pages.

* cited by examiner

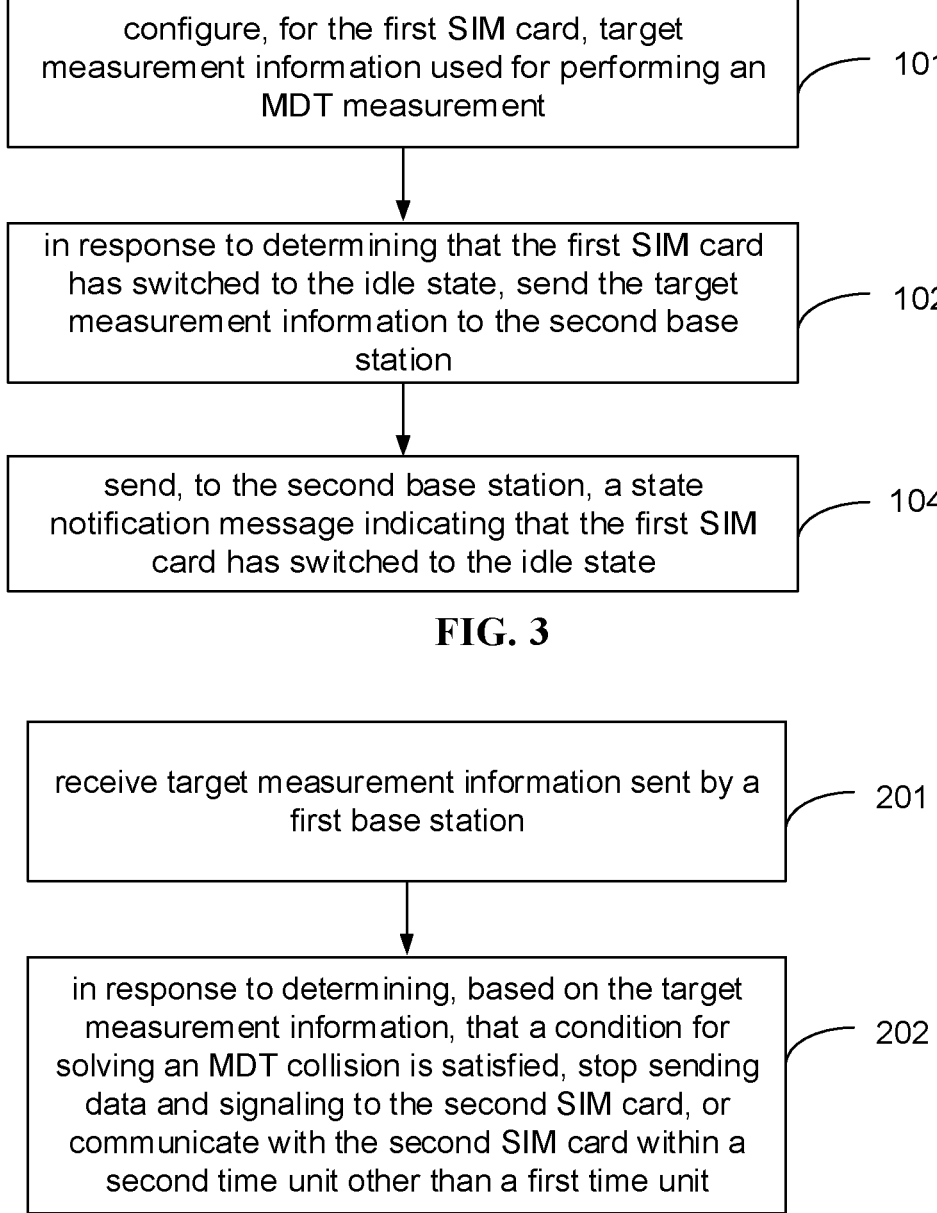

configure, for the first SIM card, target measurement information used for performing an MDT measurement — 101 in response to determining that the first SIM card has switched to the idle state, send the target measurement information to the second base station — 102 send, to the second base station, a state notification message indicating that the first SIM card has switched to the idle state — 104

FIG. 3 receive target measurement information sent by a first base station — 201 in response to determining, based on the target measurement information, that a condition for solving an MDT collision is satisfied, stop sending data and signaling to the second SIM card, or communicate with the second SIM card within a second time unit other than a first time unit — 202

FIG. 4

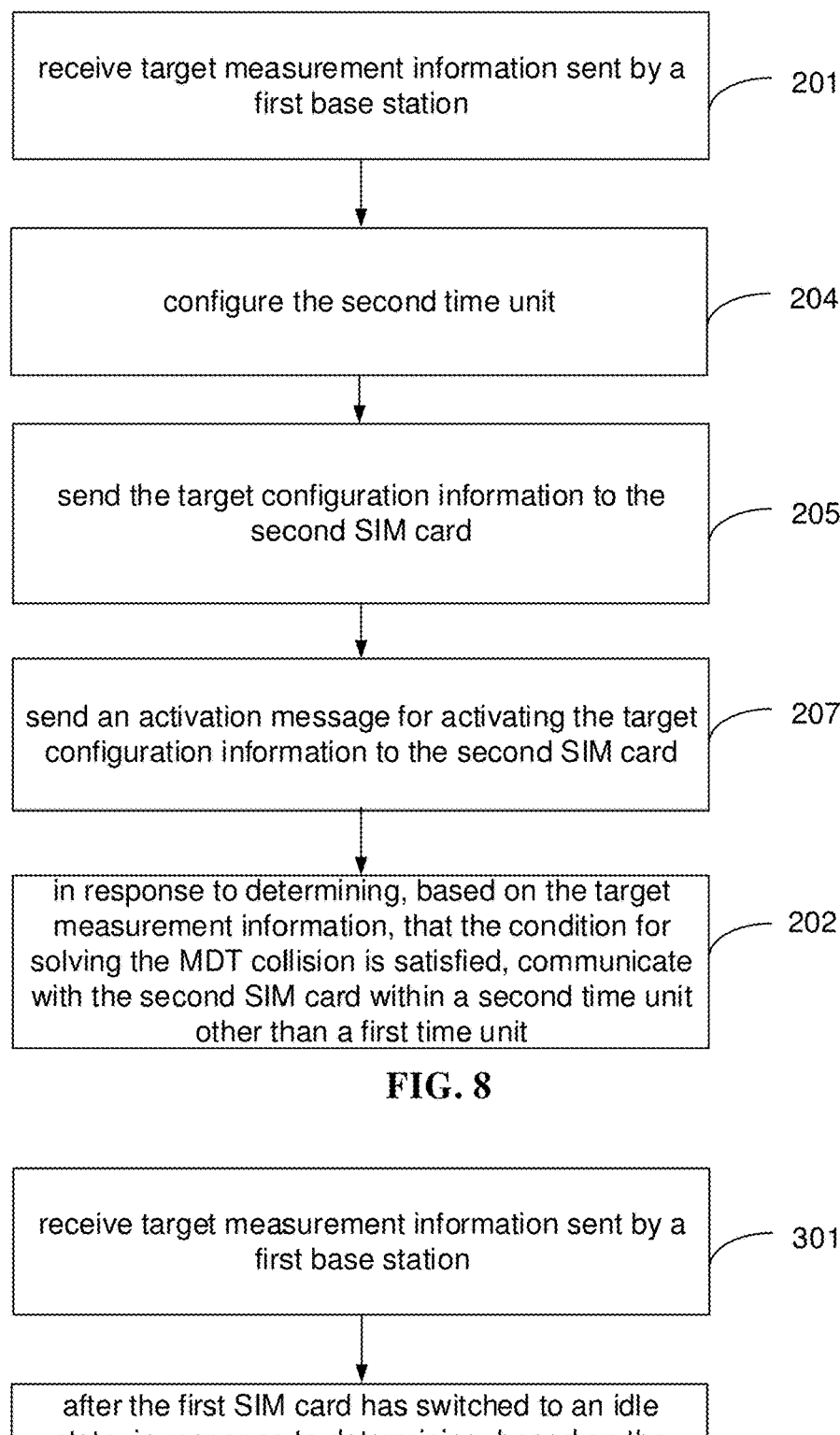

receive target measurement information sent by a first base station — 201 configure the second time unit — 204 send the target configuration information to the second SIM card — 205 send an activation message for activating the target configuration information to the second SIM card — 207 in response to determining, based on the target measurement information, that the condition for solving the MDT collision is satisfied, communicate with the second SIM card within a second time unit other than a first time unit — 202

FIG. 8 receive target measurement information sent by a first base station — 301 after the first SIM card has switched to an idle state, in response to determining, based on the target measurement information, that the MDT measurement needs to be performed by the first SIM card, perform the MDT measurement by the first SIM card — 302

FIG. 9

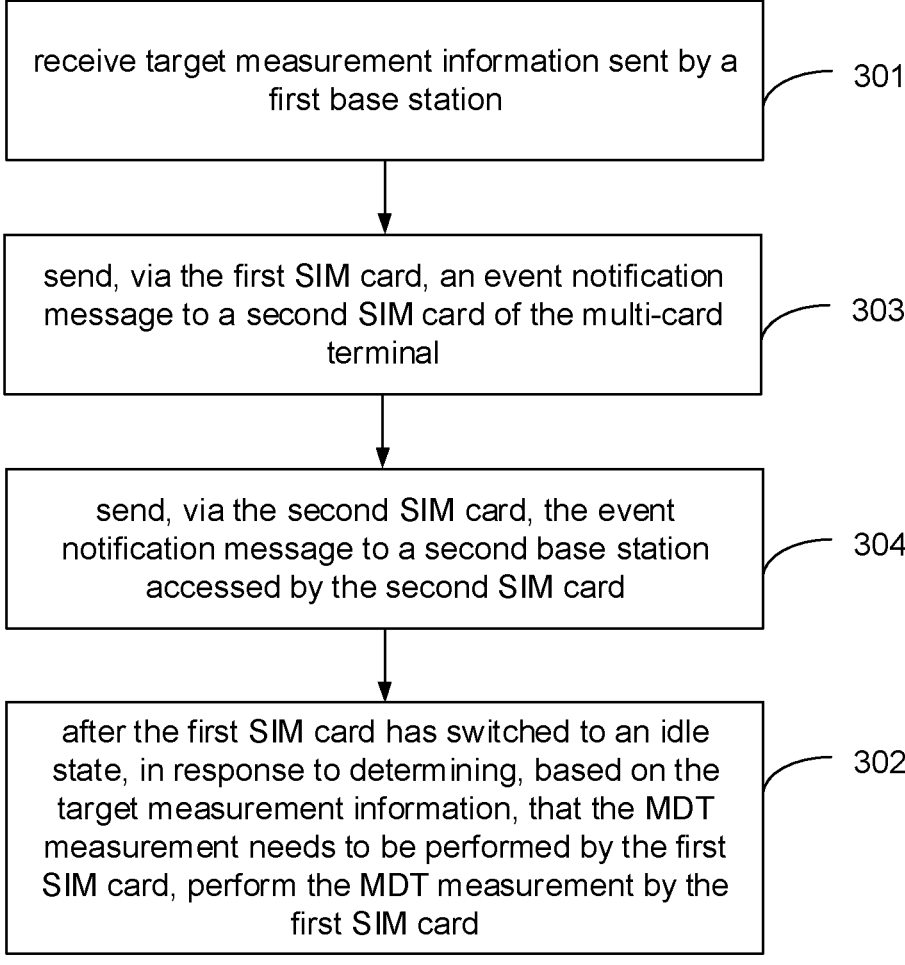

receive target measurement information sent by a first base station          301 send, via the first SIM card, an event notification message to a second SIM card of the multi-card terminal          303 send, via the second SIM card, the event notification message to a second base station accessed by the second SIM card          304 after the first SIM card has switched to an idle state, in response to determining, based on the target measurement information, that the MDT measurement needs to be performed by the first SIM card, perform the MDT measurement by the first SIM card          302

FIG. 10

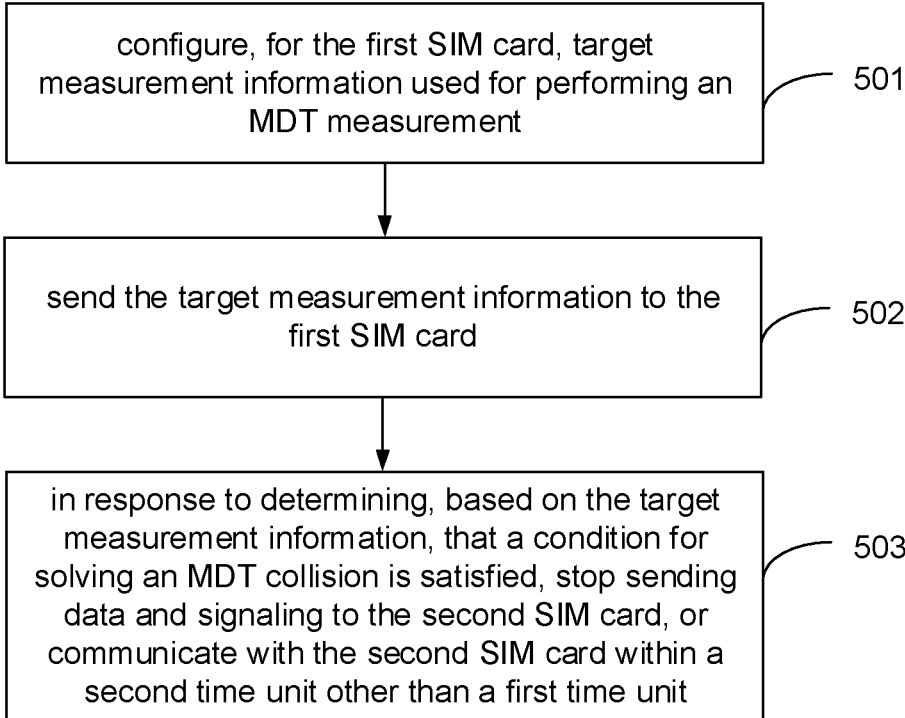

configure, for the first SIM card, target measurement information used for performing an MDT measurement ⟶ 501 send the target measurement information to the first SIM card ⟶ 502 in response to determining, based on the target measurement information, that a condition for solving an MDT collision is satisfied, stop sending data and signaling to the second SIM card, or communicate with the second SIM card within a second time unit other than a first time unit ⟶ 503

202
2 processing
component 202
4 wireless transmitting/
receiving component

2026 antenna
component

COMMUNICATION METHOD AND APPARATUS, AND STORAGE MEDIUM

CROSS-REFERENCE TO RELATED APPLICATION

This application is a national phase of International Application No. PCT/CN2020/118558, filed on Sep. 28, 2020, the content of which is hereby incorporated by reference in its entirety.

TECHNICAL FIELD

The disclosure relates to a field of communication technologies, in particular to a communication method, a communication apparatus, and a storage medium.

BACKGROUND

A drive test can detect the state of a wireless communication network by directly measuring and evaluating the network performance indicators to find problems in the network. Generally, the network optimization is performed based on drive test data.

In the 3rd Generation Partnership Project (3GPP), a Minimization of Drive Tests (MDT) is defined for obtaining relevant parameters needed for the network optimization through mainly the measurement reports reported by mobile phones.

SUMMARY

According to a first aspect of the disclosure, a communication method performed by a first base station is provided. The first base station is accessed by a first Subscriber Identity Module (SIM) card of a multi-card terminal. The method includes:

configuring, for the first SIM card, target measurement information used for performing a Minimization of Drive Tests (MDT) measurement; and sending the target measurement information to a second base station and the first SIM card, in which the second base station is accessed by a second SIM card of the multi-card terminal.

According to a second aspect of the disclosure, a communication method performed by a second base station is provided. The second base station is accessed by a second Subscriber Identity Module (SIM) card of a multi-card terminal. The method includes:

receiving target measurement information sent by a first base station, in which the first base station is accessed by a first SIM card of the multi-card terminal, and the target measurement information is configured to perform a Minimization of Drive Tests (MDT) measurement; and in response to determining, based on the target measurement information, that a condition for solving an MDT collision is satisfied, stopping sending data and signaling to the second SIM card, or communicating with the second SIM card within a second time unit other than a first time unit, in which the first time unit is a time unit within which the first SIM card performs the MDT measurement.

According to a third aspect of the disclosure, a communication method performed by a multi-card terminal is provided. The method includes:

receiving target measurement information sent by a first base station, in which the first base station is accessed by a first Subscriber Identity Module (SIM) card of the multi-card terminal, and the target measurement information is configured to perform a Minimization of Drive Tests (MDT) measurement; and after the first SIM card is switched to an idle state, in response to determining, based on the target measurement information, that there is a need to perform the MDT measurement by the first SIM card, performing the MDT measurement by the first SIM card.

According to a fourth aspect of the disclosure, a communication device is provided. The communication device includes:

a processor;

a memory for storing instructions executable by the processor; in which the processor is configured to perform the communication method described in the first aspect above.

According to a fifth aspect of the disclosure, a communication device is provided. The communication device includes:

a processor;

a memory for storing instructions executable by the processor; in which the processor is configured to perform the communication method described in the second aspect above.

According to a sixth aspect of the disclosure, a communication device is provided. The communication device includes:

a processor;

a memory for storing instructions executable by the processor; in which the processor is configured to perform the communication method described in the third aspect above.

It is understandable that the above general description and the following detailed descriptions are examples only and do not limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

FIG. 3 is a flowchart illustrating another communication method performed by a first base station according to some embodiments.

FIG. 4 is a flowchart illustrating another communication method performed by a second base station according to some embodiments.

FIG. 8 is a flowchart illustrating another communication method performed by a second base station according to some embodiments.

FIG. 9 is a flowchart illustrating another communication method performed by a multi-card terminal according to some embodiments.

FIG. 10 is a flowchart illustrating another communication method performed by a multi-card terminal according to some embodiments.

FIG. 13 is a flowchart illustrating another communication method performed by a third base station according to some embodiments.

DETAILED DESCRIPTION

Figures 1, 2:
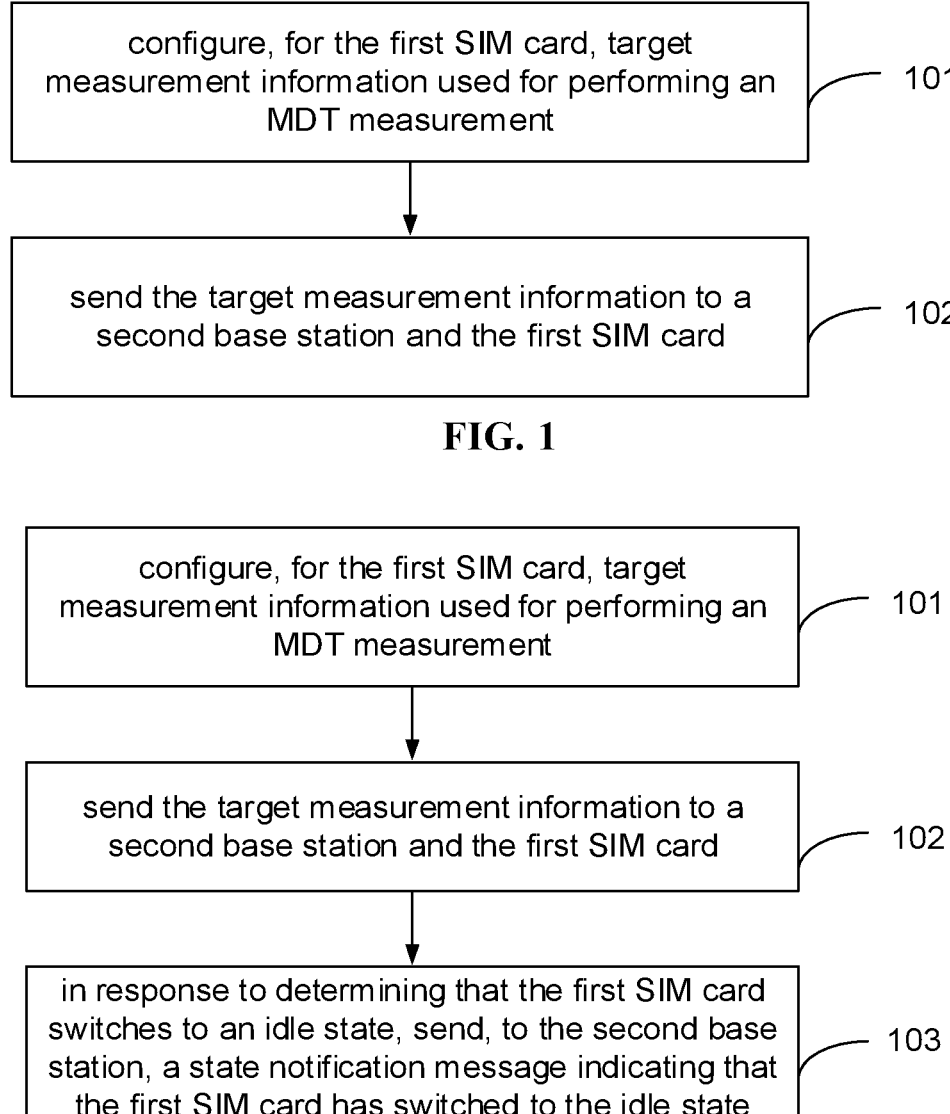
FIG. 1 is a flowchart illustrating a communication method performed by a first base station according to some embodiments.
FIG. 2 is a flowchart illustrating another communication method performed by a first base station according to some embodiments.

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims.

The terms used in the disclosure are only for the purpose of describing specific embodiments, and are not intended to limit the disclosure. The singular forms of "a", "said" and "the" used in the disclosure and appended claims are also intended to include plural forms, unless the context clearly indicates other meanings. It is understandable that the term "and/or" as used herein refers to and includes any or all possible combinations of one or more associated listed items.

It is understandable that while the terms "first", "second", and "third" may be used in this disclosure to describe various types of information, such information should not be limited to these terms. These terms are used only to distinguish information of the same type from each other. For example, without departing from the scope of the disclosure, the first information may also be referred to as the second information, and similarly, the second information may also be referred to as the first information. Depending on the context, for example, the term "if" as used herein may be interpreted as "when" or "while" or "in response to determining".

Generally, the network optimization is performed based on drive test data. For example, the network data, such as electrical level and quality collected by drive test instruments, are analyzed to find out the problems of the network, such that the network optimization is performed for problematic areas. However, the above approach often requires significant human resources, material resources and financial investment, as well as high experience requirements for the network optimization personnel.

In the 3rd Generation Partnership Project (3GPP), a Minimization of Drive Tests (MDT) is defined for obtaining relevant parameters needed for the network optimization through mainly the measurement reports reported by mobile phones.

A multi-card terminal generally applies for more than one International Mobile Equipment Identity (IMEI) number, and each IMEI corresponds to one International Mobile Subscriber Identity (IMSI). The network side generally considers different Subscriber Identity Module (SIM) card as different terminals separately, and multiple SIM cards of the multi-card terminal carry out data transmission with the network side separately.

In the related art, if a multi-card terminal is a dual-card terminal having two Subscriber Identity Module (SIM) cards, when the multi-card terminal communicates with a first system via one of the two SIM cards, the multi-card terminal needs to detect a second system corresponding to the other one of the two SIM cards from time to time, such as monitoring the paging, performing the measurement, reading the system messages, and performing MDT, which may have an impact on performances of the first system. If these operations are not performed for the second system, for example, not performing the MDT measurement for the second system, which will lead to MDT unavailability.

The communication solution provided by the disclosure is firstly described below for the case where a first Subscriber Identity Module (SIM) card and one or more second SIM cards of a multi-card terminal access respectively different base stations. It is noteworthy that one multi-card terminal including a first SIM card and one or more second SIM cards involved in the embodiments of the disclosure is used for illustration purposes, where the first SIM card of the multi-card terminal is used for performing a Minimization of Drive Tests (MDT) measurement, and there may be one first SIM card. A second SIM card is any one of SIM cards of the multi-card terminal different from the first SIM card, and there may be one or more second SIM cards, which is not limited in the disclosure.

The embodiments of the disclosure provide a communication method, as illustrated in FIG. 1. FIG. 1 is a flowchart illustrating a communication method according to some embodiments. The method can be performed by a first base station. The first base station is a base station accessed by a first SIM card of a multi-card terminal. The method includes the following.

At step 101, for the first SIM card, target measurement information used for performing an MDT measurement is configured.

In the embodiments of the disclosure, the target measurement information may be configured to indicate network parameters need to be measured by the first SIM card in performing the MDT measurement. The network parameters include, but are not limited to, geographic location, cell identity, cell signal quality parameters, and cell service quality parameters.

In addition, the target measurement information may be also configured to indicate a trigger condition for the first SIM card to perform the MDT measurement, which includes, but is not limited to, any of the followings: an event trigger condition for performing the MDT measurement, or a periodic trigger condition for performing the MDT measurement.

The event trigger condition may include, but is not limited to, an event where the cell signal quality is less than or equal to a preset threshold. The periodic trigger condition may include a period during which the MDT measurement is performed.

At step 102, the target measurement information is sent to a second base station and the first SIM card.

In embodiments of the disclosure, the second base station is accessed by a second SIM card of the multi-card terminal, and the second base station is different from the first base station. In embodiments of the disclosure, the target measurement information is sent to the first SIM card firstly and then to the second base station, alternatively, the target measurement information is sent to the second base station firstly and then to the first SIM card, which is not limited to the disclosure.

In embodiments of the disclosure, the first SIM card of the multi-card terminal accesses the first base station, and the second SIM card accesses the second base station. When the first base station is different from the second base station, the first base station may configure, for the first SIM card, the target measurement information used for performing the MDT measurement, and may send the target measurement information to the first SIM card, such that the first SIM card can perform the MDT measurement based on the target measurement information. In addition, the first base station also sends the target measurement information to the second base station, such that the second base station may solve an MDT collision based on the target measurement information by stopping sending data and signaling to the second SIM card or communicating with the second SIM card within a second time unit other than a first time unit, thereby avoiding the MDT collision between different SIM cards of the multi-card terminal. In one embodiment, for the above step 102, the target measurement information can be sent to the second base station by the first base station through a preset interface between the base stations.

If the first base station and the second base station are both base stations of the 4th generation mobile communication technology (4G), the preset interface between the base stations can be the X2 interface.

If the first base station and the second base station are both the base stations of the 5th generation mobile communication technology (5G), the preset interface between the base stations can be the Xn interface.

In the above embodiments, the target measurement information, configured for the first SIM card, used for performing the MDT measurement can be sent by the first base station to the second base station directly through the preset interface between base stations, such that the second base station can determine, based on the target measurement information, whether to solve the MDT collision, thereby avoiding the MDT collision between different SIM cards of the multi-card terminal.

In one embodiment, as illustrated in FIG. 2, FIG. 2 is a flowchart illustrating another communication method according to the embodiments illustrated in FIG. 1. After performing the step 102 of sending the target measurement information to the second base station, the method may further include the following.

At step 103, in response to determining that the first SIM card switches to an idle state, a state notification message indicating that the first SIM card has switched to the idle state is sent to the second base station.

In embodiments of the disclosure, considering that the first SIM card needs to switch to the idle state to perform the MDT measurement, the first base station can send the state notification message to the second base station after determining that the first SIM card switches to the idle state, and after the second base station receives the state notification message, the second base station determines, based on the target measurement information, whether to solve the MDT collision, thereby avoiding the MDT collision between different SIM cards of the multi-card terminal.

The state notification message is configured to notify the second base station that the first SIM card has switched to the idle state.

In the above embodiments, after the first base station configures the target measurement information for the first SIM card and sends the target measurement information to the second base station, the first base station can send the state notification message to the second base station if the first SIM card switches to the idle state, which is easy to implement and highly usable.

In one embodiment, for the above step 102, sending the target measurement information to the second base station includes:

in response to determining that the first SIM card has switched to an idle state, sending the target measurement information to the second base station.

In embodiments of the disclosure, the first base station configures the target measurement information for the first SIM card firstly and does not send the target measurement information immediately upon completing the configuration. Instead, the first base station sends the target measurement information to the second base station in response to determining that the first SIM card has switched to the idle state.

Correspondingly, as illustrated in FIG. 3, FIG. 3 is a flowchart illustrating another communication method according to the embodiments illustrated in FIG. 1. The method further includes the following.

At step 104, the state notification message indicating that the first SIM card has switched to the idle state is sent to the second base station.

In embodiments of the disclosure, the step 104 and the step 102 of sending the target measurement information to the second base station can be performed synchronically. In other words, the first base station sends the target measurement information together with the state notification message to the second base station.

In the above embodiments, the first base station configures the target measurement information for the first SIM card firstly, and sends the target measurement information together with the state notification message to the second base station in response to determining that the first SIM card switches to the idle state, which is easy to implement and highly usable.

Embodiments of the disclosure provide another communication method as illustrated in FIG. 4. FIG. 4 is a flowchart illustrating another communication method according to some embodiments. The method is performed by a second base station. The second base station is accessed by a second SIM card of a multi-card terminal. The method includes the following.

At step 201, target measurement information sent by a first base station is received.

In embodiments of the disclosure, the first base station is accessed by the first SIM card of the multi-card terminal, and the target measurement information is used for performing the MDT measurement.

The target measurement information is configured to indicate network parameters need to be measured by the first SIM card in performing the MDT measurement. The network parameters include, but are not limited to, geographical location, cell identity, cell signal quality parameters, and cell service quality parameters.

In addition, the target measurement information is also configured to indicate a trigger condition for the first SIM card to perform the MDT measurement, which includes, but is not limited to, any of the followings: an event trigger condition for performing the MDT measurement or a periodic trigger condition for performing the MDT measurement.

At step 202, in response to determining, based on the target measurement information, that a condition for solving an MDT collision is satisfied, the second base station stops sending data and signaling to the second SIM card or communicates with the second SIM card within a second time unit other than a first time unit.

In an example, if the target measurement information is configured to indicate the event trigger condition, the second base station may determine that the condition for solving the MDT collision is satisfied if receiving an event notification message from the second SIM card. At this time, the second base station may solve the MDT collision. The event notification message is configured to indicate an event that the first SIM card is about to perform the MDT measurement.

In another example, if the target measurement information is configured to indicate the periodic trigger condition, the second base station may determine that the condition for solving the MDT collision is satisfied if a periodic starting time point indicated by the periodic trigger condition is reached. At this time, the second base station also solves the MDT collision.

In embodiments of the disclosure, no matter which condition is satisfied, i.e., the event notification message is received or the periodic starting time point indicated by the periodic trigger condition is reached, the second base station solves the MDT collision in either of the following ways.

In a first way, the second base station stops sending data and signaling to the second SIM card.

In an example, the second base station stops sending data and signaling to the second SIM card by means of dynamic scheduling, thereby avoiding any impact on performing the MDT measurement by the first SIM card.

In a second way, the second base station communicates with the second SIM card within a second time unit other than a first time unit.

In an example, the second base station may perform data and/or signaling communication with the second SIM card within the second time unit by means of semi-persistent scheduling. The first time unit is a time unit within which the first SIM card performs the MDT measurement.

In the above embodiments, in response to determining, based on the target measurement information sent by the first base station, that the condition for solving the MDT collision is satisfied, the second base station can solve the MDT collision by stopping sending data and signaling to the second SIM card or communicating with the second SIM card within the second time unit other than the first time unit, thereby avoiding the MDT collision between different SIM cards of the multi-card terminal.

Figure 5:
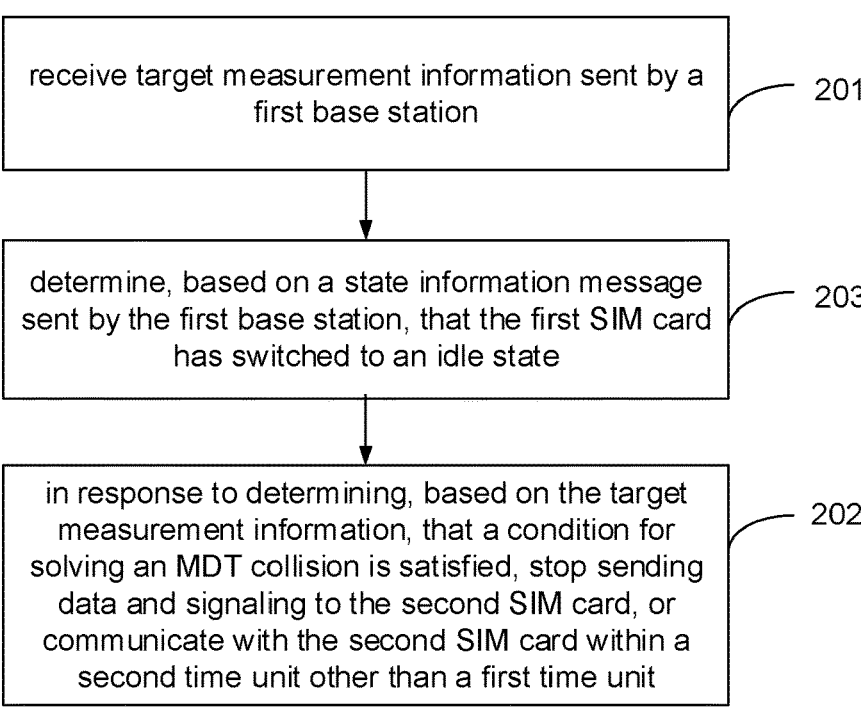
FIG. 5 is a flowchart illustrating another communication method performed by a second base station according to some embodiments.

In one embodiment, as illustrated in FIG. 5, FIG. 5 is a flowchart illustrating another communication method according to embodiments illustrated in FIG. 4. The above method may further include the following.

At step 203, it is determined, based on the state information message sent by the first base station, that the first SIM card has switched to an idle state.

In embodiments of the disclosure, the second base station can determine that the first SIM card has switched to the idle state after receiving the state notification message sent by the first base station via a preset interface between the base stations, and then perform the step 202 of stopping sending data and signaling to the second SIM card or communicating with the second SIM card within the second time unit other than the first time unit, in response to determining, based on the target measurement information, that the preset condition for solving the MDT collision is satisfied.

In the above embodiments, the second base station can determine, based on the target measurement information, whether there is a need to solve the MDT collision after determining, based on the state notification message sent by the first base station, that the first SIM card has switched to the idle, which is easy to implement and highly available.

Figure 6:
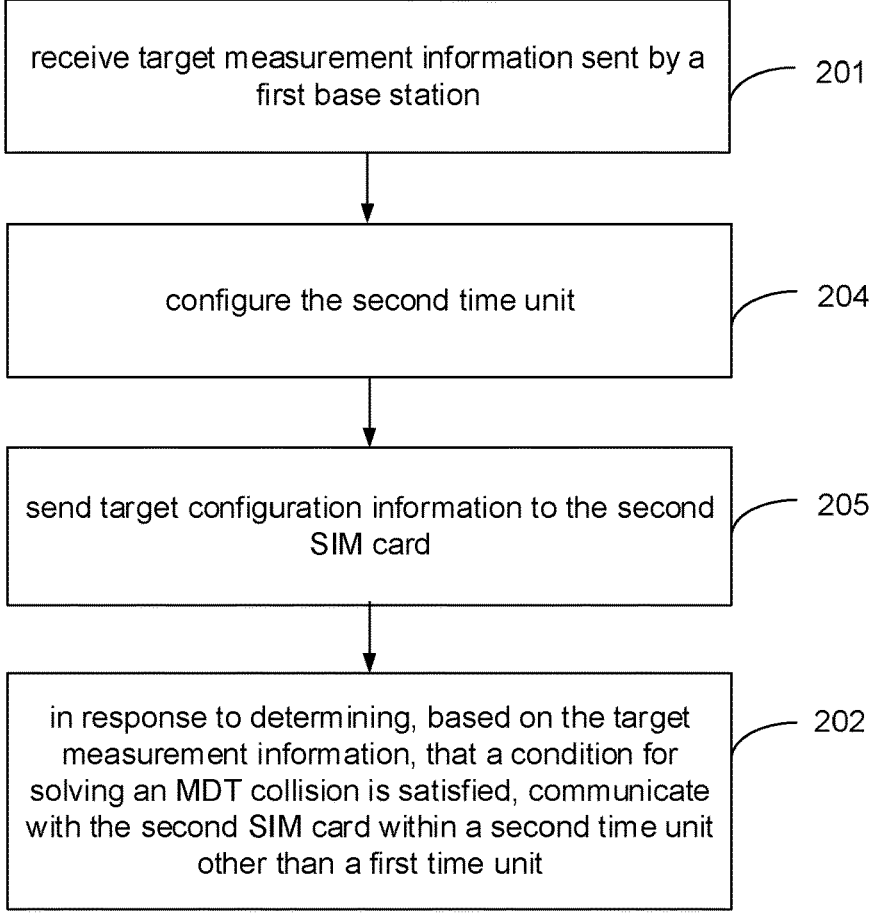
FIG. 6 is a flowchart illustrating another communication method performed by a second base station according to some embodiments.

In one embodiment, as illustrated in FIG. 6, FIG. 6 is a flowchart illustrating another communication method according to the embodiments illustrated in FIG. 4. Before performing the step 202 of communicating with the second SIM card within the second time unit other than the first time unit, the method further includes the following.

At step 204, the second time unit is configured.

In embodiments of the disclosure, a time unit that can be used together with the first time unit for the time-division multiplexing is the second time unit.

As an example, if the time unit within which the first SIM card performs the MDT measurement is the time unit 1, 3, 5 or 7, then the time unit 2, 4, 6 or 8 can be determined by the second base station by means of semi-persistent scheduling as the second time unit.

At step 205, target configuration information is sent to the second SIM card.

The target configuration information is configured to indicate the second SIM card to communicate with the second base station within the second time unit.

In the above embodiments, the second base station configures the first time unit and the second time unit in a such time-division multiplexing form that the communication performed between the second base station and the second SIM card within the second time unit will not affect the MDT measurement performed by the first SIM card within the first time unit, which is highly usable.

Figure 7:
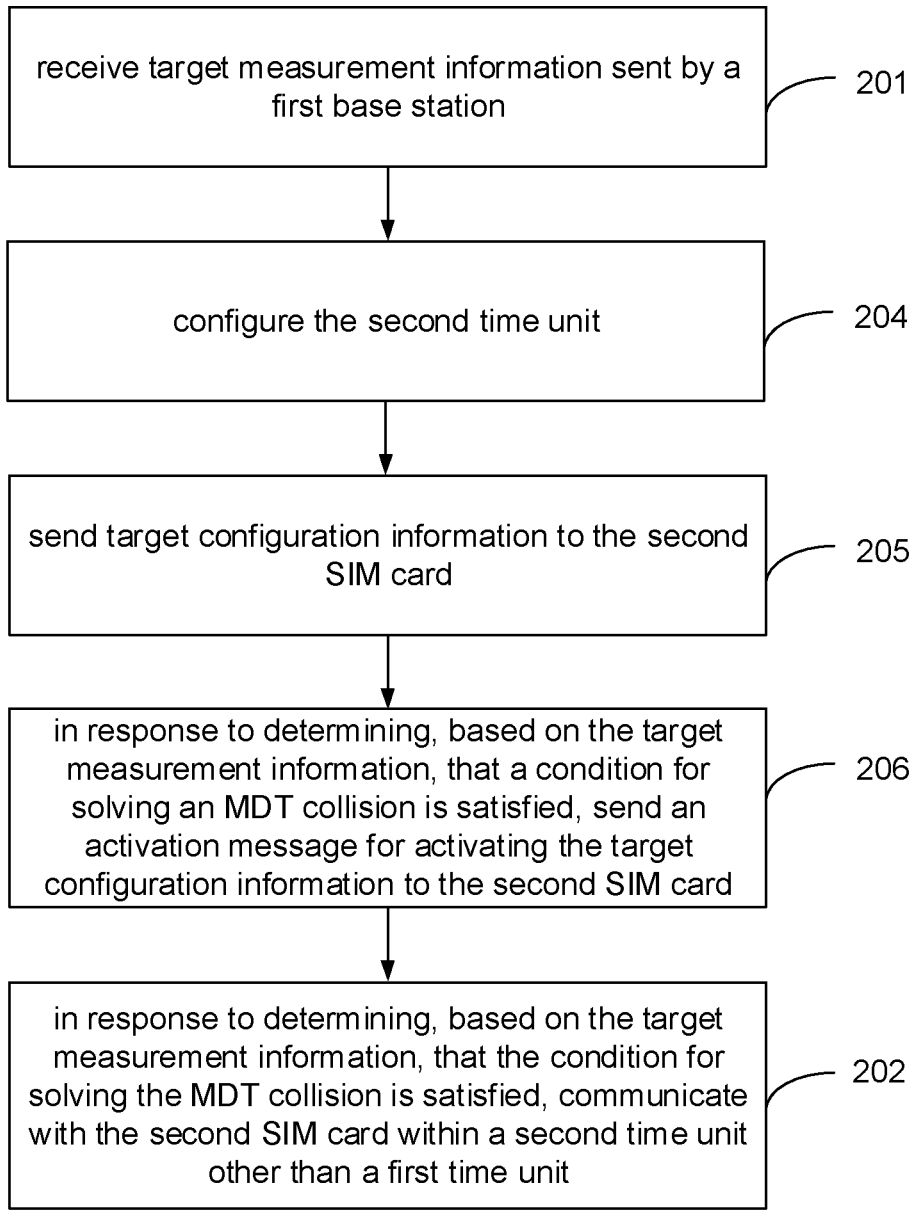
FIG. 7 is a flowchart illustrating another communication method performed by a second base station according to some embodiments.

In one embodiment, as illustrated in FIG. 7, FIG. 7 is a flowchart illustrating another communication method according to the embodiments illustrated in FIG. 6. After the step 205, the method may further include the following.

At step 206, in response to determining, based on the target measurement information, that the condition for solving the MDT collision is satisfied, an activation message for activating the target configuration information is sent to the second SIM card.

In embodiments of the disclosure, the second base station sends the target configuration information to the second SIM card firstly, and after the second base station determines, based on the target measurement information, that the condition for solving the MDT collision is satisfied, i.e., the second base station needs to solve the MDT collision, the target configuration information is activated by the activation message to allow the second SIM card to communicate with the second base station within the second time unit.

In the above embodiments, the second base station sends the target configuration information to the second SIM card firstly, and then send, in response to needing to solve the MDT collision, the activation message to the second SIM card to activate the target configuration information, which is easy to implement and highly usable.

In one embodiment, step 205 may include:

in response to determining, based on the target measurement information, that the condition for solving the MDT collision is satisfied, sending the target configuration information to the second SIM card.

Correspondingly, the second base station may send the target configuration information and the activation message for activating the target configuration information synchronically to the second SIM card, as illustrated in FIG. 8, FIG. 8 is a flowchart illustrating another communication method according to the embodiments illustrated in FIG. 6. The method further includes the following.

At step 207, an activation message for activating the target configuration information is sent to the second SIM card.

In the above embodiments, when it is determined that solving the MDT collision is required, the second base station sends the target configuration information to the second SIM card, and synchronically sends the activation message for activating the target configuration information to the second SIM card, such that the second base station can communicate with the second SIM card within the second time unit, which is highly usable.

Embodiments of the disclosure provide another communication method, as illustrated in FIG. 9. FIG. 9 is a flowchart illustrating a communication method according to some embodiments. The method is performed by a multi-card terminal. The multi-card terminal includes a first SIM card and a second SIM card, or the multi-card terminal includes a first SIM card and more than one second SIM card. The method includes the following.

At step 301, target measurement information sent by a first base station is received.

The first base station is accessed by the first SIM card of the multi-card terminal, and the target measurement information is configured to perform a MDT measurement.

In embodiments of the disclosure, the target measurement information is configured to indicate network parameters need to be measured by the first SIM card in performing the MDT measurement. The network parameters include, but are not limited to, geographic location, cell identity, cell signal quality parameters, and cell service quality parameters.

In addition, the target measurement information is also configured to indicate a trigger condition for the first SIM card to perform the MDT measurement, which includes, but is not limited to, any of the followings: an event trigger condition for performing the MDT measurement, or a periodic trigger condition for performing the MDT measurement.

At step 302, after the first SIM card has switched to an idle state, in response to determining, based on the target measurement information, that there is a need to perform the MDT measurement by the first SIM card, the MDT measurement is performed by the first SIM card.

In embodiments of the disclosure, when the target measurement information is configured to indicate the event trigger condition, the multi-card terminal may determine whether the event trigger condition is satisfied by the first SIM card. If the event trigger condition is satisfied, the multi-card terminal determines that the MDT measurement needs to be performed by the first SIM card.

For example, the event trigger condition is that the cell signal quality is less than or equal to a preset threshold. Therefore, the first SIM determines that the MDT measurement needs to be performed by the first SIM card if the measured cell signal quality of the current cell is less than or equal to the preset threshold.

In addition, when the target measurement information is configured to indicate the periodic trigger condition, the multi-card terminal may determine that the MDT measurement needs to be performed by the first SIM card if the periodic starting time point indicated by the periodic trigger condition is reached.

The multi-card terminal can perform the MDT measurement based on the network parameters to be measured as indicated by the target measurement information.

In the above embodiments, the first SIM card of the multi-card terminal can perform the MDT measurement based on the target measurement information sent by the first base station, and the second base station accessed by the second SIM card will solve the MDT collision to avoid the MDT collision between different SIM cards of the multi-card terminal.

In one embodiment, as illustrated in FIG. 10, FIG. 10 is a flowchart illustrating another communication method according to the embodiments illustrated in FIG. 9. After determining, by the first SIM card, that the event trigger condition is satisfied, the method may further include the following.

At step 303, an event notification message is sent through the first SIM card to the second SIM card of the multi-card terminal.

In embodiments of the disclosure, if the first SIM card determines that the event trigger condition is satisfied, the first SIM card determines that the MDT measurement needs to be performed, and the event notification message is sent to the second SIM card of the multi-card terminal. The event notification message is configured to indicate an event that the first SIM card is about to perform the MDT measurement.

At step 304, the event notification message is sent by the second SIM card to a second base station accessed by the second SIM card.

In embodiments of the disclosure, the second SIM card may send the event notification message to the second base station. The second base station can solve the MDT collision after receiving the event notification message.

In above embodiments, after the first SIM card of the multi-card terminal determines that the event trigger condition is satisfied, the first SIM card sends the event notification message to the second SIM card, and the second SIM card sends the event notification message to the second base station, so that the second base station can solve the MDT collision, which is highly usable.

In one embodiment, while the multi-card terminal performs the MDT measurement via the first SIM card, the second base station may stop sending data and signaling to the second SIM card, i.e., the second base station does not send data and signaling to the second SIM card, thereby avoiding the MDT collision.

Figure 11:
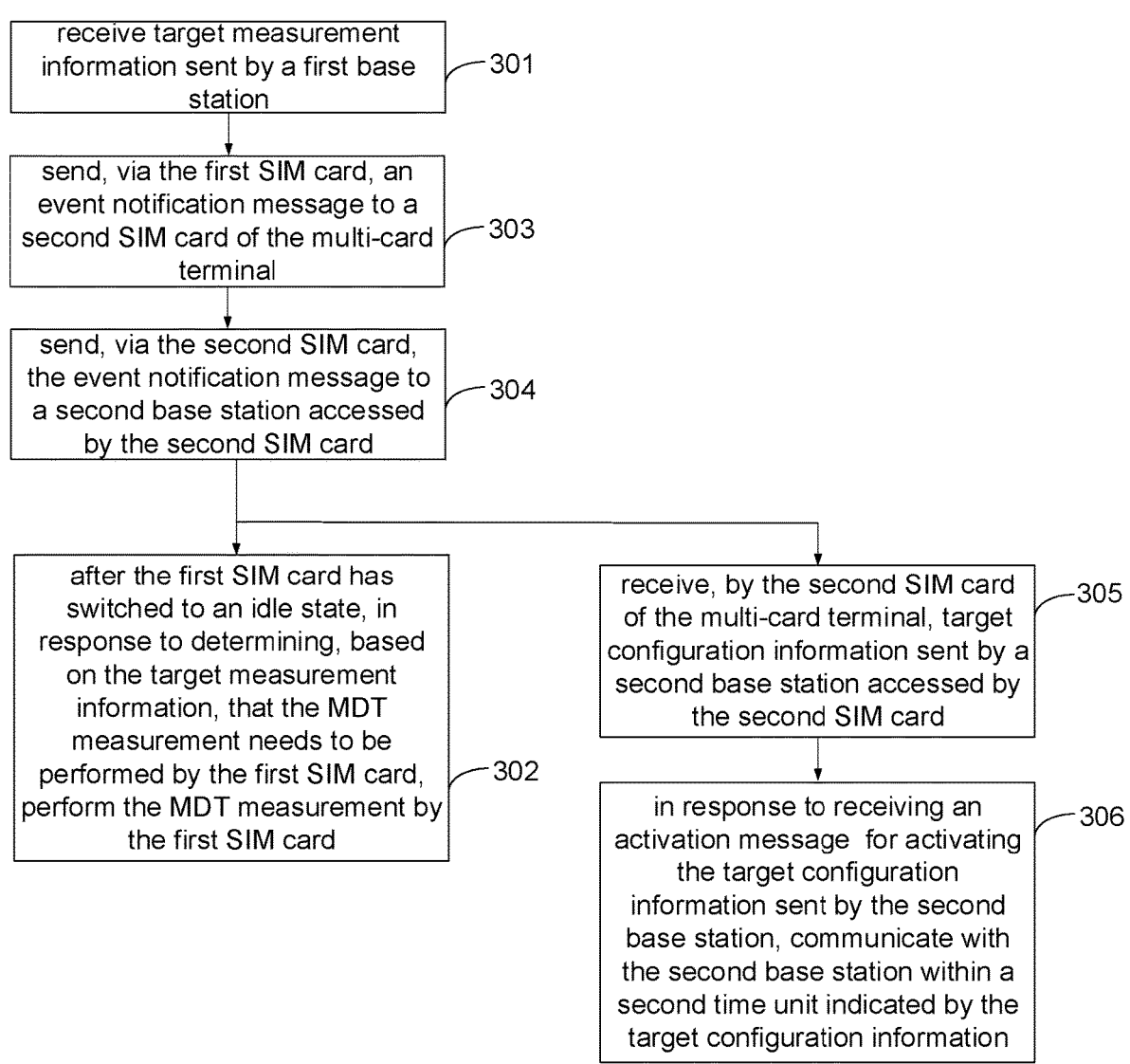
FIG. 11 is a flowchart illustrating another communication method performed by a multi-card terminal according to some embodiments.

Alternatively, as illustrated in FIG. 11, FIG. 11 is a flowchart illustrating another communication method according to the embodiments illustrated in FIG. 10. The method may further include the following.

At step 305, target configuration information sent by the second base station accessed by the second SIM card of the multi-card terminal is received by the second SIM card.

In embodiments of the disclosure, the target configuration information is configured to indicate the second SIM card to communicate with the second base station within the second time unit.

At step 306, in response to receiving an activation message for activating the target configuration information sent by the second base station, the multi-card terminal communicates with the second base station within a second time unit indicated by the target configuration information.

In embodiments of the disclosure, the second SIM card may communicate with the second base station within the second time unit indicated by the target configuration information after receiving the activation message from the second base station.

In the above embodiments, the first SIM card performs the MDT measurement within the first time unit, while the second SIM card communicates with the second base station within the second time unit, thereby avoiding the MDT collision between different SIM cards of the multi-card terminal.

Figure 12:
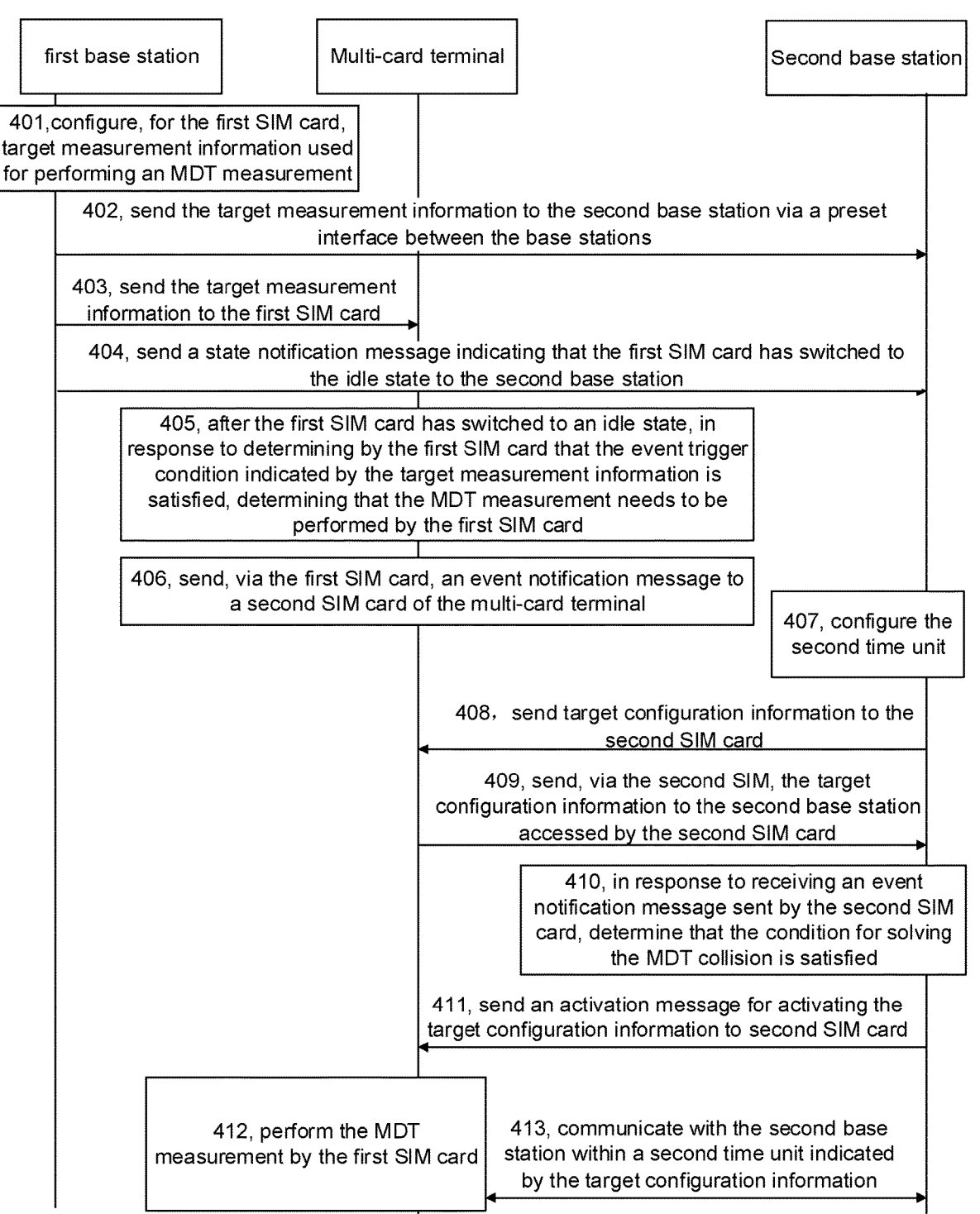
FIG. 12 is a flowchart illustrating another communication method performed by a communication system including a first base station, a second base station and a multi-card terminal according to some embodiments.

In one embodiment, as illustrated in FIG. 12, FIG. 12 is a flowchart illustrating another communication method according to some embodiments. The method may include the following.

At step 401, a first base station configures, for a first SIM card, target measurement information used for performing an MDT measurement.

At step 402, the first base station sends the target measurement information to a second base station via a preset interface between the base stations.

At step 403, the first base station sends the target measurement information to the first SIM card.

At step 404, the first base station sends a state notification message indicating that the first SIM card has switched to an idle state to the second base station.

At step 405, after the first SIM card has switched to the idle state, in response to determining, via the first SIM card, that an event trigger condition indicated by the target measurement information is satisfied, the multi-card terminal determines that there is a need to perform the MDT measurement by the first SIM card.

At step 406, the multi-card terminal sends, by the first SIM card, an event notification message to a second SIM card of the multi-card terminal.

The event notification message is configured to indicate an event that the first SIM card is about to perform the MDT measurement.

At step 407, the second base station configures a second time unit.

At step 408, the second base station sends the target configuration information to the second SIM card.

The target configuration information is configured to indicate the second SIM card to communicate with the second base station within the second time unit.

At step 409, the multi-card terminal sends, via the second SIM card, the event notification message to the second base station accessed by the second SIM card.

At step 410, in response to receiving the event notification message sent by the second SIM card, the second base station determines that the condition for solving the MDT collision is satisfied.

At step 411, the second base station sends an activation message for activating the target configuration information to the second SIM card.

At step 412, the multi-card terminal performs, by the first SIM card, the MDT measurement.

At step 413, the multi-card terminal communicates, via the second SIM card, with the second base station within the second time unit indicated by the target configuration information.

In the above embodiments, the first SIM card can perform the MDT measurement within the first time unit when it is determined, based on the event trigger condition as indicated by the target measurement information, that the MDT measurement needs to be performed by the first SIM card. The second base station allows the second SIM card to communicate with the second base station within the second time unit by means of semi-persistent scheduling, thereby avoiding the MDT collision between different SIM cards of the multi-card terminal.

In embodiments of the disclosure, the above step 405 may be replaced by: in response to determining that a periodic starting time point indicated by the periodic trigger condition indicated by the target measurement information is reached, determining by the multi-card that the MDT measurement needs to be performed by the first SIM card (not illustrated in FIG. 12).

Correspondingly, the steps 406 and 409 may be omitted (not illustrated in FIG. 12), and the step 410 may be replaced by: in response to determining that the periodic starting time point indicated by the periodic trigger condition indicated by the target measurement information is reached, determining by the second base station that the condition for solving the MDT collision is satisfied (not illustrated in FIG. 12).

In the above embodiments, the first SIM card can perform the MDT measurement within the first time unit when it is determined, based on the periodic trigger condition indicated by the target measurement information, that the MDT measurement needs to be performed via the first SIM card. The second base station can also allow the second SIM card to communicate with the second base station within the second time unit by means of the semi-persistent scheduling, thereby avoiding the MDT collision between different SIM cards of the multi-card terminal.

In embodiments of the disclosure, the steps 407, 408, and 411 may be omitted, and the step 413 may be replaced by: the second base station stopping sending data and signaling to the second SIM card (not illustrated in FIG. 12).

In the above embodiments, the second base station can stop sending data and signaling to the second SIM card while the first SIM card is performing the MDT measurement, thereby avoiding the MDT collision between different SIM cards of the multi-card terminal.

The above embodiments are all related to the case where the first SIM card and the second SIM card of the multi-card terminal access different base stations respectively. Below, the communication solution according to the disclosure will be described the case where the first SIM card and the second SIM card of the multi-card terminal access the same base station.

Embodiments of the disclosure provide another communication method, as illustrated in FIG. 13. FIG. 13 is a flowchart illustrating another communication method according to some embodiments. The method is performed by a third base station. The third base station is accessed by a first SIM card and a second SIM card of a multi-card terminal. The method includes the following.

At step 501, the third base station configures, for the first SIM card, target measurement information used for performing an MDT measurement.

In embodiments of the disclosure, the manner of configuring by the third base station the target measurement information is the same as the manner of configuring by the first base station the target measurement information, which will not be repeated here.

At step 502, the target measurement information is sent to the first SIM card.

In embodiments of the disclosure, since the first SIM card and the second SIM card access the same base station, i.e., the third base station, the third base station does not need to send the target measurement information to the second base station accessed by the second SIM card, and it only needs to send the configured target measurement information to the first SIM card.

At step 503, in response to determining, based on the target measurement information, that a condition for solving the MDT collision is satisfied, the third base station stops sending data and signaling to the second SIM card or the third base station communicates with the second SIM card within a second time unit other than a first time unit.

In embodiments of the disclosure, the manner of solving by the third base station the MDT collision is the same as the manner of solving by second base station the MDT collision, which will not be repeated here.

In the above embodiments, in the case where the first SIM card and the second SIM card of the multi-card terminal access the same third base station, the third base station configures, for the first SIM card, the target measurement information used for performing the MDT measurement and send the target measurement information to the first SIM card, so that the first SIM card performs the MDT measurement based on the target measurement information. In addition, the third base station may solve the MDT collision based on the target measurement information by stopping sending data and signaling to the second SIM card or communicating with the second SIM card within the second time unit other than the first time unit, thereby avoiding the MDT collision between different SIM cards of the multi-card terminal.

In embodiments of the disclosure, other operations need to be performed by the third base station, such as determining whether the condition for solving the MDT collision is satisfied, configuring the second time unit, sending the target configuration information to the second SIM card, sending the activation message to the second SIM card, and the like, are the same as those performed by the second base station, which will not be repeated here.

In addition, for the operations to be performed by the multi-card terminal, the first base station and the second base station involved therein may be directly replaced by the third base station and the other remains unchanged, which is not repeated here.

Figure 14:
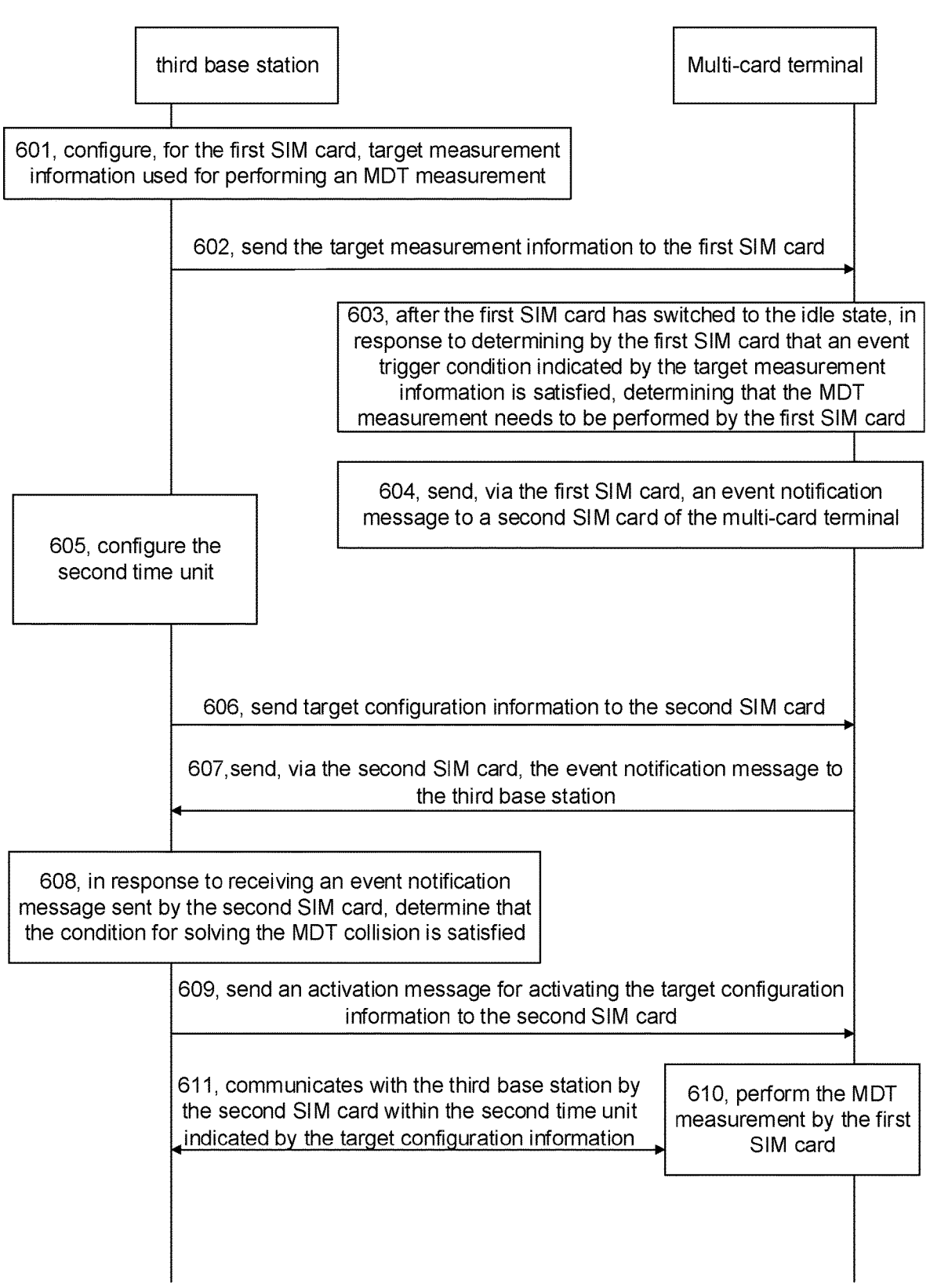
FIG. 14 is a flowchart illustrating another communication method performed by a communication system including a third base station and a multi-card terminal according to some embodiments.

For ease of understanding, the disclosure provides another communication method for the case where the first SIM card and the second SIM card access the same third base station. FIG. 14 is a flowchart illustrating another communication method according to some embodiments. The method may include the following.

At step 601, the third base station configures, for the first SIM card, target measurement information used for performing an MDT measurement.

At step 602, the third base station sends the target measurement information to the first SIM card.

At step 603, after the first SIM card has switched to the idle state, in response to determining via the first SIM card that an event trigger condition indicated by the target measurement information is satisfied, the multi-card terminal determines that the MDT measurement needs to be performed by the first SIM card.

At step 604, the multi-card terminal sends, via the first SIM card, an event notification message to the second SIM card of the multi-card terminal.

The event notification message is configured to indicate an event that the first SIM card is about to perform the MDT measurement.

At step 605, the third base station configures the second time unit.

At step 606, the third base station sends the target configuration information to the second SIM card.

The target configuration information is configured to indicate the second SIM card to communicate with the third base station within the second time unit.

At step 607, the multi-card terminal sends, via the second SIM card, the event notification message to the third base station.

At step 608, in response to receiving the event notification message sent by the second SIM card, the third base station determines that the condition for solving the MDT collision is satisfied.

At step 609, the third base station sends an activation message for activating the target configuration information to the second SIM card.

At step 610, the multi-card terminal performs, via the first SIM card, the MDT measurement.

At step 611, the multi-card terminal communicates, via the second SIM card, with the third base station within the second time unit indicated by the target configuration information.

In the above embodiments, the first SIM card can perform the MDT measurement within the first time unit when it is determined, based on the event trigger condition indicated by the target measurement information, that the MDT measurement needs to be performed by the first SIM card. The third base station allows the second SIM card to communicate with the third base station within the second time unit by means of the semi-persistent scheduling, thereby avoiding the MDT collision between different SIM cards of the multi-card terminal.

Corresponding to the aforementioned application function implementing method embodiments, the disclosure also provides application function implementing devices embodiments.

Figure 15:
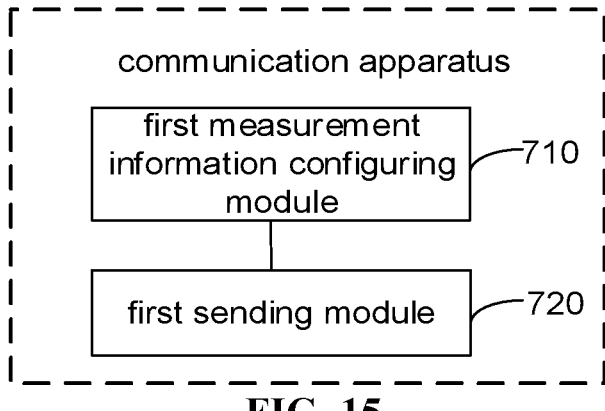
FIG. 15 is a block diagram illustrating a communication apparatus according to some embodiments.

As illustrated in FIG. 15, FIG. 15 is a block diagram illustrating a communication apparatus according to some embodiments. The apparatus is applied to a first base station. The first base station is accessed by a first SIM card of a multi-card terminal. The apparatus includes: a first measurement information configuring module 710 and a first sending module 720.

The first measurement information configuring module 710 is configured to configure, for the first SIM card, target measurement information used for performing an MDT measurement.

The first sending module 720 is configured to send the target measurement information to a second base station and the first SIM card. The second base station is accessed by a second SIM card of the multi-card terminal.

Figure 16:
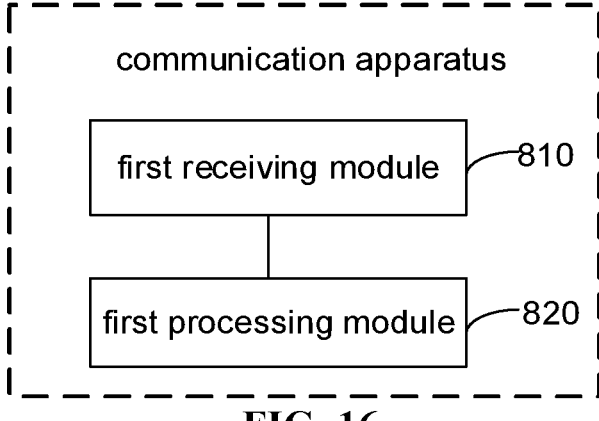
FIG. 16 is a block diagram illustrating another communication apparatus according to some embodiments.

As illustrated in FIG. 16, FIG. 16 is a block diagram illustrating another communication apparatus according to some embodiments. The apparatus is applied to a second base station. The second base station is accessed by a second SIM card of a multi-card terminal. The apparatus includes a first receiving module 810 and a first processing module 820.

The first receiving module 810 is configured to receive target measurement information sent by a first base station. The first base station is accessed by a first SIM card of the multi-card terminal, and the target measurement information is used for performing an MDT measurement.

The first processing module 820 is configured to, in response to determining, based on the target measurement information, that a condition for solving an MDT collision is satisfied, stop sending data and signaling to the second SIM card or communicate with the second SIM card within a second time unit other than a first time unit. The first time unit is a time unit within which the first SIM card performs the MDT measurement.

Figure 17:
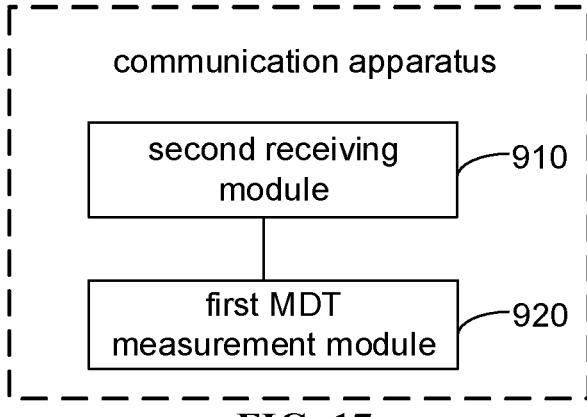
FIG. 17 is a block diagram illustrating another communication apparatus according to some embodiments.

As illustrated in FIG. 17, FIG. 17 is a block diagram illustrating another communication apparatus according to some embodiments. The apparatus is applied to a multi-card terminal. The apparatus includes a second receiving module 910 and a first MDT measurement module 920.

The second receiving module 910 is configured to receive target measurement information sent by a first base station. The first base station is accessed by a first SIM card of the multi-card terminal, and the target measurement information is used for performing an MDT measurement.

The first MDT measurement module 920 is configured to, after the first SIM card has switched to an idle state, in response to determining, based on the target measurement information, that the MDT measurement needs to be performed by the first SIM card, perform the MDT measurement by the first SIM card.

Figure 18:
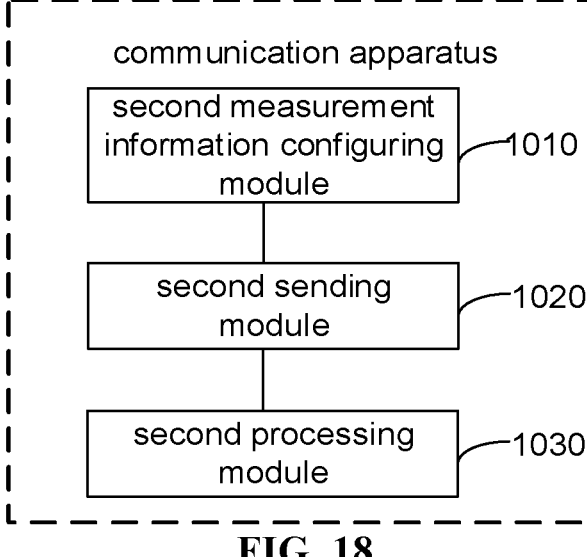
FIG. 18 is a block diagram illustrating another communication apparatus according to some embodiments.

As illustrated in FIG. 18, FIG. 18 is a block diagram illustrating another communication apparatus according to some embodiments. The apparatus is applied to a third base station. The third base station is accessed by a first SIM card and a second SIM card of a multi-card terminal. The apparatus includes a second measurement information configuring module 1010, a second sending module 1020, and a second processing module 1030.

The second measurement information configuring module 1010 is configured to configure, for the first SIM card, target measurement information used for performing an MDT measurement.

The second sending module 1020 is configured to send the target measurement information to the first SIM card.

The second processing module 1030 is configured to, in response to determining, based on the target measurement information, that a condition for solving an MDT collision is satisfied, stop sending data and signaling to the second SIM card or communicate with the second SIM card within a second time unit other than a first time unit. The first time unit is a time unit within which the first SIM card performs the MDT measurement.

Figure 19:
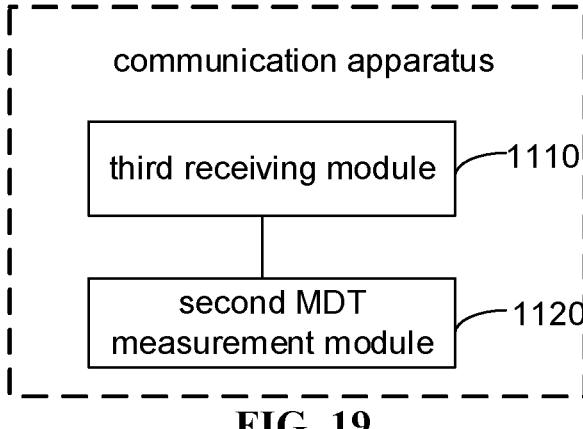
FIG. 19 is a block diagram illustrating another communication apparatus according to some embodiments.

As illustrated in FIG. 19, FIG. 19 is a block diagram illustrating another communication apparatus according to some embodiments. The apparatus is applied to a multi-card terminal. The apparatus includes a third receiving module 1110 and a second MDT measurement module 1120.

The third receiving module 1110 is configured to receive target measurement information sent by a third base station. The third base station is accessed by a first SIM card and a second SIM card of the multi-card terminal, and the target measurement information is used for performing an MDT measurement.

The second MDT measurement module 1120 is configured to, after the first SIM card has switched to an idle state, in response to determining, based on the target measurement information, that the MDT measurement needs to be performed by the first SIM card, perform the MDT measurement by the first SIM card.

The apparatus embodiments basically correspond to the method embodiments, and the apparatus embodiments can refer to the descriptions of the method embodiments for the relevant part. The above-described apparatus embodiments are merely schematic, where the units described above as separate components may or may not be physically separated, and the components displayed as units may or may not be physical units, i.e., the units may be located in one place or may be distributed to multiple network units. Some or all of these modules can be selected according to practical needs to achieve the purpose of this disclosed solution. It is understood and implemented by those skilled in the art without inventive works.

Accordingly, the disclosure further provides a computer readable storage medium having computer programs stored thereon. The computer programs are configured to perform the above communication method on the first base station side.

Accordingly, the disclosure further provides a computer readable storage medium having computer programs stored thereon. The computer programs are configured to perform the above communication method on the second base station side.

Accordingly, the disclosure further provides a computer readable storage medium having computer programs stored thereon. The computer programs are configured to perform the above communication method on the multi-card terminal side.

Accordingly, the disclosure further provides a computer readable storage medium having computer programs stored thereon. The computer programs are configured to perform the above communication method on the third base station side.

Accordingly, the disclosure further provides a computer readable storage medium having computer programs stored thereon. The computer programs are configured to perform the above communication method on the multi-card terminal side.

Accordingly, a communication device is provided. The communication device includes:

a processor;

a memory for storing instructions executable by the processor; in which the processor is configured to perform any of the communication method described above on the base station side.

The above-mentioned base station side includes, but is not limited to, the first base station, the second base station, or the third base station.

Figure 20:
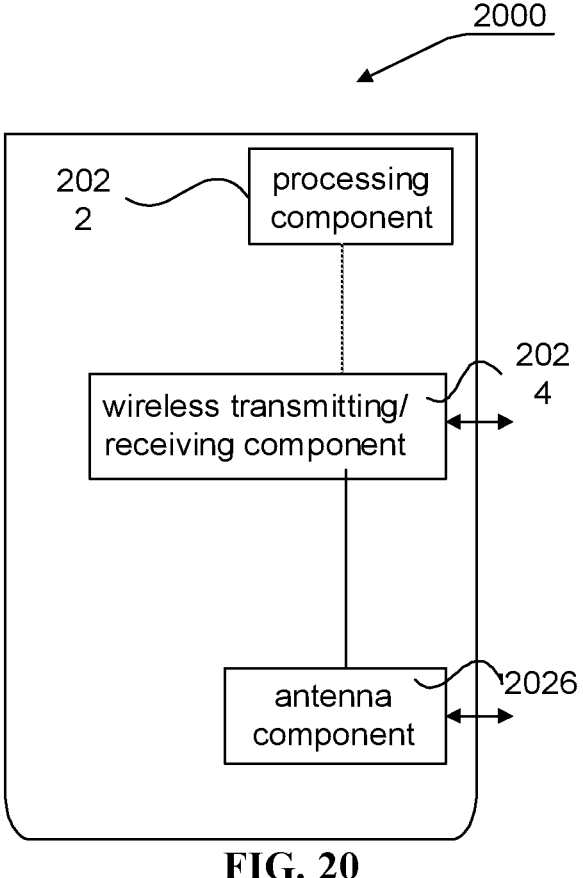
FIG. 20 is a schematic diagram illustrating a communication device according to some embodiments.

As illustrated in FIG. 20, FIG. 20 is a schematic diagram illustrating another communication device 2000 according to some embodiments. The device 2000 may be provided as a base station. As illustrated in FIG. 20, the device 2000 includes a processing component 2022, a wireless transmitting/receiving component 2024, an antenna component 2026, and a signal processing portion specific to the wireless interface. The processing component 2022 may further include one or more processors.

One of the processors in the processing component 2022 is configured to perform any of the communication method described above.

Accordingly, a communication device is provided. The communication device includes:

a processor;

a memory for storing instructions executable by the processor; in which the processor is configured to perform any of the communication method described above on the multi-card terminal side.

Figure 21:
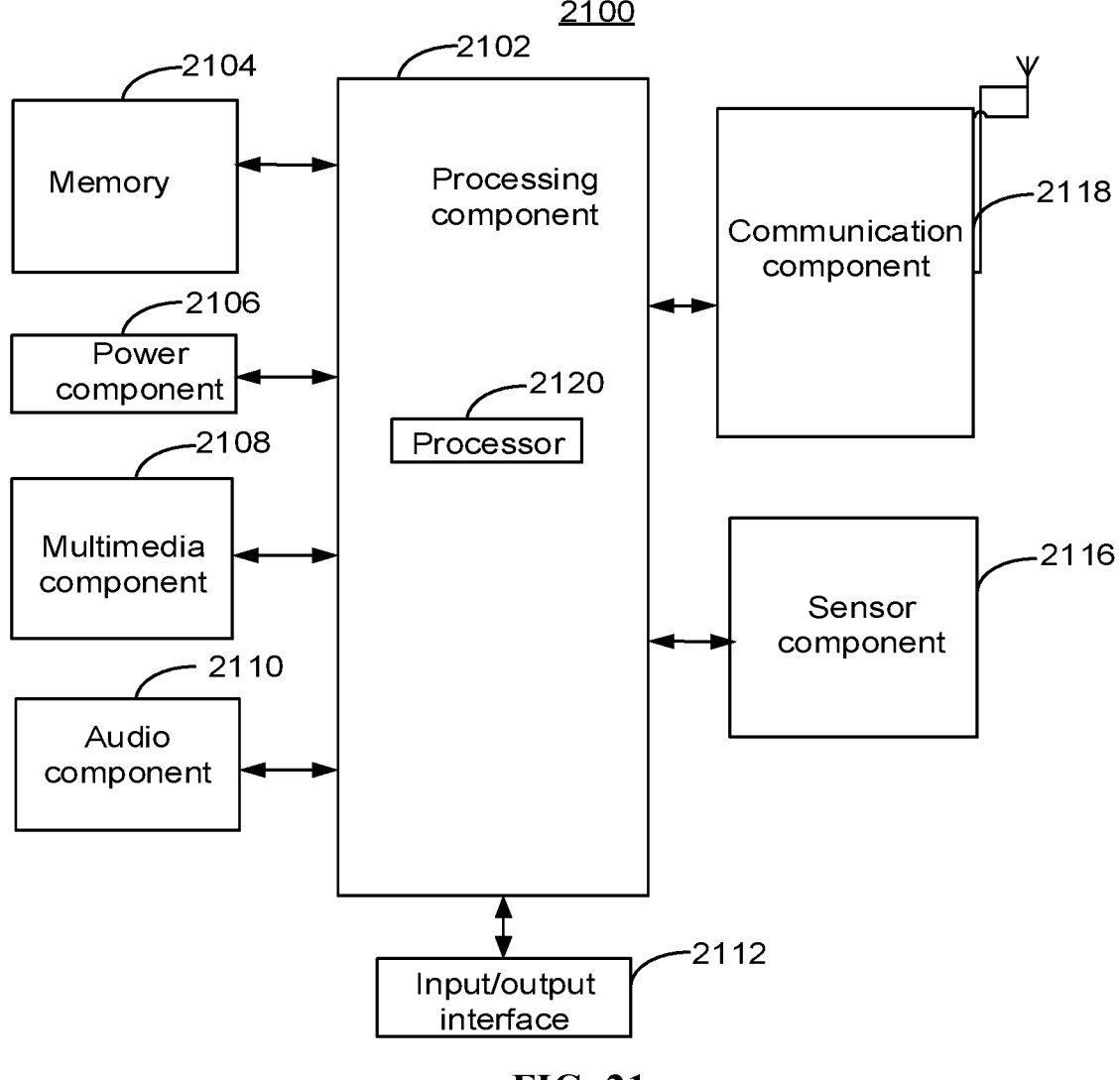
FIG. 21 is a schematic diagram illustrating another communication device according to some embodiments.

FIG. 21 is a block diagram illustrating an electronic device 2100 according to some embodiments. For example, the electronic device 2100 may be a multi-card terminal including multiple SIM cards, such as a cell phone, a tablet computer, an e-book reader, a multimedia playback device, a wearable device, an in-vehicle terminal, an iPad, and a smart TV.

As illustrated in FIG. 21, the electronic device 2100 may include one or more of the following components: a processing component 2102, a memory 2104, a power component 2106, a multimedia component 2108, an audio component 2110, an input/output (I/O) interface 2112, a sensor component 2116, and a communication component 2118.

The processing component 2102 generally controls overall operations of the electronic device 2100, such as the operations associated with display, telephone calls, data communications, camera operations, and recording operations. The processing component 2102 may include one or more processors 820 to execute instructions to perform all or part of the steps in the above described method. Moreover, the processing component 2102 may include one or more modules which facilitate the interaction between the processing component 2102 and other components. For instance, the processing component 2102 may include a multimedia module to facilitate the interaction between the multimedia component 2108 and the processing component 2102. For another example, the processing component 2102 may read executable instructions from the memory, to implement the steps of one of the communication methods provided in the above embodiments.

The memory 2104 is configured to store various types of data to support the operation of the electronic device 2100. Examples of such data include instructions for any applications or methods operated on the electronic device 2100, contact data, phonebook data, messages, pictures, video, etc. The memory 2104 may be implemented using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power component 2106 provides power to various components of the electronic device 2100. The power component 2106 may include a power management system, one or more power sources, and any other components associated with the generation, management, and distribution of power in the electronic device 2100.

The multimedia component 2108 includes a screen providing an output interface between the electronic device 2100 and the user. In some embodiments, the multimedia component 2108 includes a front-facing camera and/or a rear-facing camera. When the electronic device 2100 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 2110 is configured to output and/or input audio signals. For example, the audio component 2110 includes a microphone (MIC) configured to receive an external audio signal when the electronic device 2100 is in an operation mode, such as a call mode, a recording mode, and a voice recognition mode. The received audio signal may be further stored in the memory 2104 or transmitted via the communication component 2118. In some embodiments, the audio component 2110 further includes a speaker to output audio signals.

The I/O interface 2112 provides an interface between the processing component 2102 and peripheral interface modules, such as a keyboard, a click wheel, buttons, and the like. The buttons may include, but are not limited to, a home button, a volume button, a starting button, and a locking button.

The sensor component 2116 includes one or more sensors to provide status assessments of various aspects of the electronic device 2100. For instance, the sensor component 2116 may detect an open/closed status of the electronic device 2100, relative positioning of components, e.g., the display and the keypad, of the electronic device 2100, a change in position of the electronic device 2100 or a component of the electronic device 2100, a presence or absence of user contact with the electronic device 2100, an orientation or an acceleration/deceleration of the electronic device 2100, and a change in temperature of the electronic device 2100. The sensor component 2116 may include a proximity sensor configured to detect the presence of nearby objects without any physical contact. The sensor component 2116 may also include a light sensor, such as a CMOS or CCD image sensor, for use in imaging applications. In some embodiments, the sensor component 2116 may also include an accelerometer sensor, a gyroscope sensor, a magnetic sensor, a pressure sensor, or a temperature sensor.

The communication component 2118 is configured to facilitate communication, wired or wirelessly, between the electronic device 2100 and other devices. The electronic device 2100 can access a wireless network based on a communication standard, such as WiFi, 2G, 3G, 4G, 5G, 6G or a combination thereof. In an embodiment, the communication component 2118 receives a broadcast signal or broadcast associated information from an external broadcast management system via a broadcast channel. In an embodiment, the communication component 2118 further includes a Near Field Communication (NFC) module to facilitate short-range communications. For example, the NFC module may be implemented based on a Radio Frequency Identity (RFID) technology, an Infrared Data Association (IrDA) technology, an Ultra-Wideband (UWB) technology, a Bluetooth (BT) technology, and other technologies.

In some embodiments, the electronic device 2100 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors, or other electronic components, for performing the above communication method.

In some embodiments, there is also provided a non-transitory computer readable storage medium including instructions, such as included in the memory 2104, executable by the processor 2120 in the electronic device 2100, for performing the above method. For example, the non-transitory computer-readable storage medium may be a ROM, a RAM, a CD-ROM, a magnetic tape, a floppy disc, an optical data storage device, and the like.

The technical solutions provided by the embodiments of the disclosure may include the following beneficial effects.

In the embodiments, the first SIM card of the multi-card terminal accesses the first base station, and the second SIM card of the multi-card terminal accesses the second base station. If the first base station is different from the second base station, the target measurement information used for performing the MDT measurement is configured by the first base station for the first SIM card, and the target measurement information is sent to the first SIM card, such that the first SIM card performs the MDT measurement based on the target measurement information. In addition, the first base station may send the target measurement information to the second base station, and the second base station may solve the MDT collision based on the target measurement information by stopping sending data and signaling to the second SIM card or sending data and signaling to the second SIM card within the second time unit other than the first time unit, thereby avoiding the MDT collision between different SIM cards of the multi-card terminal.

In the embodiments, if the first SIM card and the second SIM card of the multi-card terminal accesses the same third base station, the third base station configures for the first SIM card the target measurement information used for performing the MDT measurement, and sends the target measurement information to the first SIM card, so that the first SIM card performs the MDT measurement based on the target measurement information. In addition, the third base station may solve the MDT collision based on the target measurement information by stopping sending data and signaling to the second SIM card or communicating with the second SIM card within the second time unit other than the first time unit, thereby avoiding the MDT collision between different SIM cards of the multi-card terminal.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as examples only, with a true scope and spirit of the disclosure being indicated by the claims.

In some embodiments, a communication method is performed by a first base station. The first base station is accessed by a first Subscriber Identity Module (SIM) card of a multi-card terminal. The method includes configuring, for the first SIM card, target measurement information used for performing a Minimization of Drive Tests (MDT) measurement; and sending the target measurement information to a second base station and the first SIM card. The second base station is accessed by a second SIM card of the multi-card terminal.

In some embodiments, after sending the target measurement information to the second base station, the method further includes: sending, to the second base station, a state notification message indicating that the first SIM card has switched to an idle state, in response to determining that the first SIM card switches to the idle state.

In some embodiments, sending the target measurement information to the second base station includes: sending the target measurement information to the second base station, in response to determining that the first SIM card has switched to an idle state. In addition, the method further includes: sending, to the second base station, a state notification message indicating that the first SIM card has switched to the idle state.

In some embodiments, sending the target measurement information to the second base station includes: sending the target measurement information to the second base station via a preset interface between the base stations.

In some embodiments, the target measurement information is configured to indicate any one of: an event trigger condition for performing the MDT measurement; or a periodic trigger condition for performing the MDT measurement.

In some embodiments, a communication method is performed by a second base station. The second base station is accessed by a second Subscriber Identity Module (SIM) card of a multi-card terminal. The method includes receiving target measurement information sent by a first base station. The first base station is accessed by a first SIM card of the multi-card terminal. The target measurement information is used for performing a Minimization of Drive Tests (MDT) measurement. In addition, the method further includes: stopping sending data and signaling to the second SIM card or communicating with the second SIM card within a second time unit other than a first time unit, in response to determining, based on the target measurement information, that a condition for solving an MDT collision is satisfied. The first time unit is a time unit within which the first SIM card performs the MDT measurement.

In some embodiments, the method further includes: stopping sending data and signaling to the second SIM card or communicating with the second SIM card within the second time unit other than the first time unit, in response to determining, based on the target measurement information, that a preset condition for solving the MDT collision is satisfied, after determining, based on a state notification message sent by the first base station, that the first SIM card has switched to an idle state.

In some embodiments, the target measurement information is configured to indicate any one of: an event trigger condition for performing the MDT measurement; or a periodic trigger condition for performing the MDT measurement.

In some embodiments, the target measurement information is configured to indicate the event trigger condition. Determining, based on the target measurement information, that the condition for solving the MDT collision is satisfied includes: determining that the condition for solving the MDT collision is satisfied in response to receiving an event notification message sent by the second SIM card. The event notification message is configured to indicate an event that the first SIM card is about to perform the MDT measurement.

In some embodiments, the target measurement information is configured to indicate the periodic trigger condition. Determining, based on the target measurement information, that the condition for solving the MDT collision is satisfied includes: determining that the condition for solving the MDT collision is satisfied, in response to reaching a periodic starting time point indicated by the periodic trigger condition.

In some embodiments, before communicating with the second SIM card within the second time unit other than the first time unit, the method further includes: configuring the second time unit; and sending target configuration information to the second SIM card. The target configuration information is configured to indicate the second SIM card to communicate with the second base station within the second time unit.

In some embodiments, configuring the second time unit includes: determining a time unit that is used together with the first time unit for time-division multiplexing as the second time unit.

In some embodiments, after sending the target configuration information to the second SIM card, the method further includes: sending an activation message for activating the target configuration information to the second SIM card, in response to determining, based on the target measurement information, that the condition for solving the MDT collision is satisfied.

In some embodiments, sending the target configuration information to the second SIM card includes: sending the target configuration information to the second SIM card, in response to determining, based on the target measurement information, that the condition for solving the MDT collision is satisfied. In addition, the method further includes: sending an activation message for activating the target configuration information to the second SIM card.

In some embodiments, a communication method is performed by a multi-card terminal. The method includes: receiving target measurement information sent by a first base station. The first base station is accessed by a first Subscriber Identity Module (SIM) card of the multi-card terminal. The target measurement information is used for performing a Minimization of Drive Tests (MDT) measurement. In addition, the method further includes: performing the MDT measurement by the first SIM card in response to determining, based on the target measurement information, that the MDT measurement needs to be performed by the first SIM card, after the first SIM card has switched to an idle state.

In some embodiments, the target measurement information is configured to indicate any one of: an event trigger condition for performing the MDT measurement; or a periodic trigger condition for performing the MDT measurement.

In some embodiments, the target measurement information is configured to indicate an event trigger condition. Determining, based on the target measurement information, that the MDT measurement needs to be performed by the first SIM card includes: determining that the MDT measurement needs to be performed by the first SIM card in response to determining, by the first SIM card, that the event trigger condition is satisfied.

In some embodiments, after determining, by the first SIM card, that the event trigger condition is satisfied, the method further includes: sending, via the first SIM card, an event notification message to a second SIM card of the multi-card terminal. The event notification message is configured to indicate an event that the first SIM card is about to perform the MDT measurement. In addition, the method further includes: sending, via the second SIM card, the event notification message to a second base station accessed by the second SIM card.

In some embodiments, the target measurement information is configured to indicate the periodic trigger condition. Determining, based on the target measurement information, that the condition for performing the MDT measurement by the first SIM card is satisfied includes: determining that the MDT measurement needs to be performed by the first SIM card, in response to determining that a periodic starting time point indicated by the periodic trigger condition is reached.

In some embodiments, the method further includes: receiving, via the second SIM card of the multi-card terminal, target configuration information sent by a second base station accessed by the second SIM card; and communicating with the second base station within a second time unit indicated by the target configuration information, in response to receiving an activation message for activating the target configuration information sent by the second base station.

In some embodiments, a communication method is performed by a third base station. The third base station is accessed by a first Subscriber Identity Module (SIM) card and a second SIM card of a multi-card terminal. The method includes: configuring, for the first SIM card, target measurement information used for performing a Minimization of Drive Tests (MDT) measurement; sending the target measurement information to the first SIM card; and stopping sending data and signaling to the second SIM card or communicating with the second SIM card within a second time unit other than a first time unit, in response to determining, based on the target measurement information that a condition for solving an MDT collision is satisfied. The first time unit is a time unit within which the first SIM card performs the MDT measurement.

In some embodiments, the method further includes stopping sending data and signaling to the second SIM card or communicating with the second SIM card within the second time unit other than the first time unit, in response to determining, based on the target measurement information, that the condition for solving the MDT collision is satisfied, after determining that the first SIM card has switched to an idle state.

In some embodiments, the target measurement information is configured to indicate any one of: an event trigger condition for performing the MDT measurement; or a periodic trigger condition for performing the MDT measurement.

In some embodiments, the target measurement information is configured to indicate the event trigger condition. Determining, based on the target measurement information, that the condition for solving the MDT collision is satisfied includes: determining that the condition for solving the MDT collision is satisfied in response to receiving an event notification message sent by the second SIM card. The event notification message is configured to indicate an event that the first SIM card is about to perform the MDT measurement.

In some embodiments, the target measurement information is configured to indicate the periodic trigger condition. Determining, based on the target measurement information, that the condition for solving the MDT collision is satisfied includes: determining that the condition for solving the MDT collision is satisfied in response to reaching a periodic starting time point indicated by the periodic trigger condition.

In some embodiments, before communicating with the second SIM card within the second time unit other than the first time unit, the method further includes: configuring the second time unit; and sending target configuration information to the second SIM card. The target configuration information is configured to indicate the second SIM card to communicate with the second base station within the second time unit.

In some embodiments, configuring the second time unit includes determining a time unit that is used together with the first time unit for time-division multiplexing as the second time unit.

In some embodiments, the method further includes: sending an activation message for activating the target configuration information to the second SIM card, in response to determining, based on the target measurement information, that the condition for solving the MDT collision is satisfied.

In some embodiments, sending the target configuration information to the second SIM card includes: sending the target configuration information to the second SIM card, in response to determining, based on the target measurement information, that the condition for solving the MDT collision is satisfied. In addition, the method further includes: sending an activation message for activating the target configuration information to the second SIM card.

In some embodiments, a communication method is performed by a multi-card terminal. The method includes: receiving target measurement information sent by a third base station. The third base station is accessed by a first Subscriber Identity Module (SIM) card and a second SIM card of the multi-card terminal. The target measurement information is used for performing a Minimization of Drive Tests (MDT) measurement. In addition, the method further includes: performing the MDT measurement by the first SIM card in response to determining, based on the target measurement information, that the MDT measurement needs to be performed by the first SIM card, after the first SIM card has switched to an idle state.

In some embodiments, the target measurement information is configured to indicate any one of: an event trigger condition for performing the MDT measurement; or a periodic trigger condition for performing the MDT measurement.

In some embodiments, the target measurement information is configured to indicate the event trigger condition. Determining, based on the target measurement information, that the MDT measurement needs to be performed by the first SIM card includes: determining that the MDT measurement needs to be performed by the first SIM card, in response to determining, via the first SIM card, that the event trigger condition is satisfied.

In some embodiments, after determining, via the first SIM card, that the event trigger condition is satisfied, the method further includes: sending, via the first SIM card, an event notification message to the second SIM card of the multi-card terminal. The event notification message is configured to indicate an event that the first SIM card is about to perform the MDT measurement. In addition, the method further includes: sending, via the second SIM card, the event notification message to the third base station.

In some embodiments, the target measurement information is configured to indicate the periodic trigger condition. Determining, based on the target measurement information, that the MDT measurement needs to be performed by the first SIM card includes: determining that the MDT measurement needs to be performed by the first SIM card, in response to determining that a periodic starting time point indicated by the periodic trigger condition is reached.

In some embodiments, the method further includes: receiving, via the second SIM card, target configuration information sent by the third base station; and communicating, via the second SIM card, with the second base station within a second time unit indicated by the target configuration information, in response to receiving an activation message for activating the target configuration information sent by the third base station.

In some embodiments, a communication apparatus is applied to a first base station. The first base station is accessed by a first Subscriber Identity Module (SIM) card of a multi-card terminal. The apparatus includes: a first measurement information configuring module, configured to configure, for the first SIM card, target measurement information used for performing a Minimization of Drive Tests (MDT) measurement; and a first sending module, configured to send the target measurement information to a second base station and the first SIM card. The second base station is accessed by a second SIM card of the multi-card terminal.

In some embodiments, a communication apparatus is applied to a second base station. The second base station is accessed by a second Subscriber Identity Module (SIM) card of a multi-card terminal. The apparatus includes: a first receiving module, configured to receive target measurement information sent by a first base station. The first base station is accessed by a first SIM card of the multi-card terminal and the target measurement information is used for performing a Minimization of Drive Tests (MDT) measurement. In addition, the apparatus further includes: a first processing module, configured to, in response to determining, based on the target measurement information, that a condition for solving an MDT collision is satisfied, stop sending data and signaling to the second SIM card, or communicate with the second SIM card on a second time unit other than a first time unit. The first time unit is a time unit on which the first SIM card performs the MDT measurement.

In some embodiments, a communication apparatus is applied to a multi-card terminal. The apparatus includes: a second receiving module, configured to receive target measurement information sent by a first base station. The first base station is accessed by a first Subscriber Identity Module (SIM) card of the multi-card terminal. The target measurement information is used for performing a Minimization of Drive Tests (MDT) measurement. In addition, the apparatus further includes: a first MDT measurement module, configured to, perform the MDT measurement via the first SIM card in response to determining, based on the target measurement information, that the MDT measurement needs to be performed by the first SIM card, after the first SIM card has switched to an idle state.

In some embodiments, a communication apparatus is applied to a third base station. The third base station is accessed by a first Subscriber Identity Module (SIM) card and a second SIM card of a multi-card terminal. The apparatus includes: a second measurement information configuring module, configured to configure, for the first SIM card, target measurement information used for performing a Minimization of Drive Tests (MDT) measurement; a second sending module, configured to send the target measurement information to the first SIM card; and a second processing module, configured to stop sending data and signaling to the second SIM card or communicate with the second SIM card within a second time unit other than a first time unit, in response to determining, based on the target measurement information, that a condition for solving an MDT collision is satisfied. The first time unit is a time unit within which the first SIM card performs the MDT measurement.

In some embodiments, a communication apparatus is applied to a multi-card terminal. The apparatus includes: a third receiving module, configured to receive target measurement information sent by a third base station. The third base station is accessed by a first Subscriber Identity Module (SIM) card and a second SIM card of the multi-card terminal. The target measurement information is used for performing a Minimization of Drive Tests (MDT) measurement. In addition, the apparatus further includes: a second MDT measurement module, configured to perform the MDT measurement by the first SIM card in response to determining, based on the target measurement information, that the MDT measurement needs to be performed by the first SIM card, after the first SIM card has switched to an idle state.

In some embodiments, a computer readable storage medium having a computer program stored thereon is provided. The computer program is configured to implement any one of the communication methods as described above.

In some embodiments, a communication device is provided. The communication device includes: a processor; and a memory for storing instructions executable by the processor. The processor is configured to perform any one of the communication methods as described above.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A communication method, performed by a first base station, wherein the first base station is accessed by a first Subscriber Identity Module (SIM) card of a multi-card terminal, and the method comprising:

configuring, for the first SIM card, target measurement information used for performing a Minimization of Drive Tests (MDT) measurement; and sending the target measurement information to the first SIM card to enable the first SIM card to perform the MDT measurement within a first time unit;

sending the target measurement information to a second base station, to enable the second base station to determine, based on the target measurement information, that the MDT measurement performed by the first SIM card within the first time unit collides with communication performed by a second SIM card of the multi-card terminal; and sending a state notification message indicating that the first SIM card has switched to an idle state to a second base station, in response to determining that the first SIM card switches to the idle state before performing the MDT measurement, to enable the second base station to determine that a condition for solving a collision between the MDT measurement performed by the first SIM card and the communication performed by the second SIM card is satisfied based on the target measurement information to stop sending data and signaling to the second SIM card or to communicate with the second SIM card within a second time unit different from the first time unit, wherein the second base station is accessed by the second SIM card of the multi-card terminal.

2. The method of claim 1, wherein sending the target measurement information to the second base station comprises at least one of:

sending the target measurement information to the second base station, in response to determining that the first SIM card has switched to an idle state; or sending the target measurement information to the second base station via a preset interface between the base stations.

3. The method of claim 1, wherein the target measurement information is configured to indicate any one of:

an event trigger condition for performing the MDT measurement; or a periodic trigger condition for performing the MDT measurement.

4. The method of claim 1, wherein the state notification message is sent to the second base station before or after the target measurement information is sent to the second base station.

5. The method of claim 1, wherein the target measurement information comprises at least one of geographic location, cell identity, cell signal quality parameters, or cell service quality parameters.

6. A communication method, performed by a second base station, wherein the second base station is accessed by a second Subscriber Identity Module (SIM) card of a multi-card terminal, the method comprising:

receiving target measurement information sent by a first base station, wherein the first base station is accessed by a first SIM card of the multi-card terminal, and the target measurement information is used for performing a Minimization of Drive Tests (MDT) measurement by the first SIM card within a first time unit;

determining, based on the target measurement information, that the MDT measurement performed by the first SIM card within the first time unit collides with communication performed by the second SIM card of the multi-card terminal;

determining, based on a state notification message sent by the first base station, that the first SIM card has switched to an idle state;

determining that a condition for solving a collision between the MDT measurement performed by the first SIM card and the communication performed by the second SIM card is satisfied based on the target measurement information; and stopping sending data and signaling to the second SIM card or communicating with the second SIM card within a second time unit different from the first time unit.

7. The method of claim 6, wherein the target measurement information is configured to indicate any one of:

an event trigger condition for performing the MDT measurement; or a periodic trigger condition for performing the MDT measurement.

8. The method of claim 7, wherein the target measurement information is configured to indicate the event trigger condition, and determining, based on the target measurement information, that the condition for solving the collision is satisfied comprises:

determining that the condition for solving the collision is satisfied in response to receiving an event notification message sent by the second SIM card, wherein the event notification message is configured to indicate an event that the first SIM card is about to perform the MDT measurement;

or the target measurement information is configured to indicate the periodic trigger condition, and determining, based on the target measurement information, that the condition for solving the collision is satisfied comprises:

determining that the condition for solving the collision is satisfied, in response to reaching a periodic starting time point indicated by the periodic trigger condition.

9. The method of claim 6, wherein before communicating with the second SIM card within the second time unit different from the first time unit, the method further comprises:

configuring the second time unit; and sending target configuration information to the second SIM card, wherein the target configuration information is configured to indicate the second SIM card to communicate with the second base station within the second time unit.

10. The method of claim 9, wherein configuring the second time unit comprises:

determining a time unit that is used together with the first time unit for time-division multiplexing as the second time unit.

11. The method of claim 9, wherein after sending the target configuration information to the second SIM card, the method further comprises:

sending an activation message for activating the target configuration information to the second SIM card, in response to determining that the condition for solving the collision is satisfied.

12. The method of claim 9, wherein sending the target configuration information to the second SIM card comprises:

sending the target configuration information to the second SIM card, in response to determining that the condition for solving the collision is satisfied; and the method further comprises:

sending an activation message for activating the target configuration information to the second SIM card.

13. A communication method, performed by a multi-card terminal, the method comprising:

receiving target measurement information sent by a first base station, wherein the first base station is accessed by a first Subscriber Identity Module (SIM) card of the multi-card terminal, and the target measurement information is used for performing a Minimization of Drive Tests (MDT) measurement by the first SIM card within a first time unit; and performing the MDT measurement by the first SIM card in response to determining, based on the target measurement information, that the MDT measurement needs to be performed by the first SIM card, after the first SIM card has switched to an idle state;

stopping receiving, from a second base station, data and signaling for a second SIM card of the multi-card terminal or communicating with the second SIM card within a second time unit different from a first time unit, in response to determining that the second base station determines, based on the target measurement information, that the MDT measurement performed by the first SIM card collides with communication performed by the second SIM card and determines that a condition for solving a collision between the MDT measurement performed by the first SIM card and the communication performed by the second SIM card is satisfied, wherein the second base station is accessed by the second SIM card.

14. The method of claim 13, wherein the target measurement information is configured to indicate any one of:

an event trigger condition for performing the MDT measurement; or a periodic trigger condition for performing the MDT measurement.

15. The method of claim 14, wherein the target measurement information is configured to indicate the event trigger condition, and determining, based on the target measurement information, that the MDT measurement needs to be performed by the first SIM card comprises:

determining that the MDT measurement needs to be performed by the first SIM card in response to determining, by the first SIM card, that the event trigger condition is satisfied;

or wherein the target measurement information is configured to indicate a periodic trigger condition, and determining, based on the target measurement information, that the condition for performing the MDT measurement by the first SIM card is satisfied comprises:

determining that the MDT measurement needs to be performed by the first SIM card, in response to determining that a periodic starting time point indicated by the periodic trigger condition is reached.

16. The method of claim 15, wherein after determining, by the first SIM card, that the event trigger condition is satisfied, the method further comprises:

sending, via the first SIM card, an event notification message to a second SIM card of the multi-card terminal, wherein the event notification message is configured to indicate an event that the first SIM card is about to perform the MDT measurement; and sending, via the second SIM card, the event notification message to a second base station accessed by the second SIM card.

17. The method of claim 13, further comprising:

receiving, via a second SIM card of the multi-card terminal, target configuration information sent by a second base station accessed by the second SIM card; and communicating with the second base station within a second time unit indicated by the target configuration information, in response to receiving an activation message for activating the target configuration information sent by the second base station.

18. A first base station, comprising:

a processor;

a memory for storing instructions executable by the processor; wherein the processor is configured to perform the communication method according to claim 1.

19. A second base station, comprising:

a processor;

a memory for storing instructions executable by the processor; wherein the processor is configured to perform the communication method according to claim 6.

20. A multi-card terminal, comprising:

a processor;

a memory for storing instructions executable by the processor; wherein the processor is configured to perform the communication method according to claim 13.

\* \* \* \* \*